US012347383B2

(12) United States Patent
Mitani et al.

(10) Patent No.: US 12,347,383 B2
(45) Date of Patent: Jul. 1, 2025

(54) DISPLAY DEVICE

(71) Applicant: Sharp Kabushiki Kaisha, Sakai (JP)

(72) Inventors: Masahiro Mitani, Sakai (JP); Kohzoh Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/723,503

(22) PCT Filed: Dec. 29, 2021

(86) PCT No.: PCT/JP2021/049025

§ 371 (c)(1),
(2) Date: Jun. 24, 2024

(87) PCT Pub. No.: WO2023/127167

PCT Pub. Date: Jul. 6, 2023

(65) Prior Publication Data

US 2025/0054443 A1 Feb. 13, 2025

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2320/0257* (2013.01); *G09G 2320/045* (2013.01); *G09G 2330/021* (2013.01)

(58) Field of Classification Search
CPC ......... G09G 3/3233; G09G 2300/0819; G09G 2300/0842; G09G 2300/0861; G09G 2320/0257; G09G 2320/045; G09G 2330/021
USPC ........................................................... 345/55
See application file for complete search history.

(56) References Cited

U.S. PATENT DOCUMENTS

| | | | | |
|---|---|---|---|---|
| 11,380,262 B2 * | 7/2022 | Lou | G09G 3/3275 | |
| 2012/0105427 A1 * | 5/2012 | Senda | G09G 3/3233 | 345/212 |
| 2013/0002616 A1 * | 1/2013 | Kim | H10D 30/6711 | 345/204 |
| 2015/0042635 A1 * | 2/2015 | Kimura | G09G 3/3266 | 345/212 |
| 2016/0171933 A1 * | 6/2016 | Takahara | G09G 3/3233 | 345/212 |
| 2016/0203748 A1 * | 7/2016 | Matsueda | H10K 59/353 | 345/694 |

(Continued)

FOREIGN PATENT DOCUMENTS

JP 2006-251455 A 9/2006

*Primary Examiner* — Tom V Sheng
(74) *Attorney, Agent, or Firm* — Keating & Bennett, LLP

(57) ABSTRACT

In a display device including organic EL elements OLED, a p-channel switching transistor T8 is connected at a conductive terminal to a channel region of a p-channel drive transistor T4. When holes are trapped in trap levels within the channel region of the drive transistor T4 while the display device presents a white display image, this configuration enables the holes to be extracted through the switching transistor T8 to an initialization line Vini. Consequently, a drive current flows through the drive transistor T4 in accordance with a data voltage, resulting in no perceptible afterimage even when a gray display image is presented during an immediately subsequent frame.

19 Claims, 20 Drawing Sheets

(56) References Cited

U.S. PATENT DOCUMENTS

| | | | | |
|---|---|---|---|---|
| 2016/0247441 | A1* | 8/2016 | Matsueda | G09G 3/2003 |
| 2016/0372035 | A1* | 12/2016 | Nakatani | G09G 3/3233 |
| 2021/0013272 | A1* | 1/2021 | Zhang | G09G 3/3233 |
| 2021/0125555 | A1* | 4/2021 | Yamamoto | G09G 3/3233 |
| 2022/0367597 | A1* | 11/2022 | Nishiyama | G09G 3/3233 |
| 2023/0206834 | A1* | 6/2023 | Liu | G09G 3/3233 345/212 |

* cited by examiner

17

DISPLAY DEVICE

TECHNICAL FIELD

The following disclosure relates to display devices, more specifically to display devices including current-driven light-emitting display elements, such as organic EL elements.

BACKGROUND ART

As display devices offering features such as thinness, high picture quality, and low power consumption, organic EL (electro-luminescent) display devices have gained attention in recent years to replace liquid crystal display devices, and are currently undergoing active development. Such an organic EL display device has a display panel with a plurality of pixel circuits arranged in a matrix. Each pixel circuit includes an organic EL element performing or stopping light emission with a luminance corresponding to an input data signal so that the display panel displays an image.

However, when the display panel continuously displays, for example, an image with a significant difference in luminance between bright and dark areas, such as a checkered pattern, the viewer might perceive this originally displayed screen image as an afterimage when the image switches to another one. In the case where image luminance changes from a white display to a gray display, the value of a current flowing through each drive transistor during the gray display becomes lower than that of the originally intended current, due to carriers trapped in trap levels at grain boundaries and an interface between a channel region and a gate insulation film within the drive transistor when the white display is provided. Consequently, the displayed image luminance decreases, leading to an afterimage perceptible to the viewer.

In the case of a display device disclosed in Patent Document 1, when a data signal representing a high-luminance (white display) image is written to the pixel circuit during the previous frame, carriers flowing through the drive transistor (drive TFT) may be trapped in the gate insulation film of the drive transistor, resulting in variations in threshold voltage of the drive TFT. In this case, the value of the current that flows to the drive TFT differs from an intended current value for displaying an image during the subsequent frame, resulting in an afterimage.

Therefore, in Patent Document 1, the drive TFT undergoes an increase in gate potential before the data signal is written, thereby extracting the carriers trapped within the gate insulation film to a source or a drain. This initializes electrical characteristics of the drive TFT and thereby inhibits the occurrence of an afterimage.

CITATION LIST

Patent Document

Patent Document 1: Japanese Laid-Open Patent Publication No. 2006-251455

SUMMARY

Technical Problem

However, the display device described in Patent Document 1 requires control of a precharge transistor and regulation to increase a potential on a hold capacitance line, resulting in a complex circuit configuration.

Therefore, an objective of the present application is to provide a display device that discharges carriers trapped in trap levels within the channel region, thereby inhibiting the occurrence of an afterimage during an emission period in which organic EL elements emit light, without requiring a complex circuit configuration.

Solution to the Problems

One aspect is directed to a display device including a plurality of data lines for providing data signals representing an image to be displayed, a plurality of scanning lines crossing the data lines, a plurality of pixel circuits arranged corresponding to respective crossing points of the data lines and the scanning lines, and a constant voltage supply line supplying each pixel circuit with a predetermined voltage, each pixel circuit corresponds to one of the data lines and one of the scanning lines, each pixel circuit includes a light-emitting display element configured to emit light with a luminance corresponding to an amount of current supply, a capacitive element, a drive transistor connected at a control terminal to a terminal of the capacitive element and configured to regulate the amount of current supply to the light-emitting display element in accordance with a voltage written to the capacitive element, and a switching transistor connected at a first conductive terminal to a channel region of the drive transistor and at a second conductive terminal to the constant voltage supply line, and each pixel circuit is configured such that when the corresponding scanning line is active, a voltage on the corresponding data line is provided to the control terminal of the drive transistor and thereby written to the capacitive element, and such that if the control terminal of the drive transistor is being provided with at least a voltage corresponding to a maximum or minimum display luminance, the switching transistor is in ON state.

Effects of the Disclosure

In one aspect, the switching transistor is connected at one conductive terminal to the channel region of the drive transistor, which supplies the light-emitting display element with a drive current, and at the other conductive terminal to the voltage supply line. When a large current is applied to the drive transistor in order to display a high-luminance image using a pixel circuit configured as described above, carriers are trapped in trap levels within the channel region. In this case, if the switching transistor is to be designed turned on simultaneously, electric fields on the voltage supply line cause the carriers trapped in the trap levels to be released from the drive transistor. The released carriers are extracted through the switching transistor to the voltage supply line, resulting in fewer carriers left trapped within the channel region. Accordingly, the drive current flowing through the drive transistor is less likely to be affected by the trapped carriers, with the result that the light-emitting display element is supplied with a current corresponding to a data signal. Consequently, when a high-luminance image is displayed in an area during the current frame, and the area is provided with a data signal for displaying a lower-luminance image during the subsequent frame, the area displays an image with the original luminance corresponding to the data signal. This results in no afterimage, which is otherwise perceptible as an image with a lower or higher luminance than the luminance corresponding to the data signal.

DESCRIPTION OF EMBODIMENTS

Before describing each embodiment according to the disclosure, a basic study will be described regarding the configuration of a pixel circuit including an internal compensation circuit and the reason why an afterimage occurs. Note that unless otherwise specified herein, the wording "connected" is used to mean the "state of electrical connection", which encompasses not only direct connections but also indirect connections without deviating from the essence of the disclosure.

1. Basic Study

1.1 Configuration of Pixel Circuit

Figure 1:
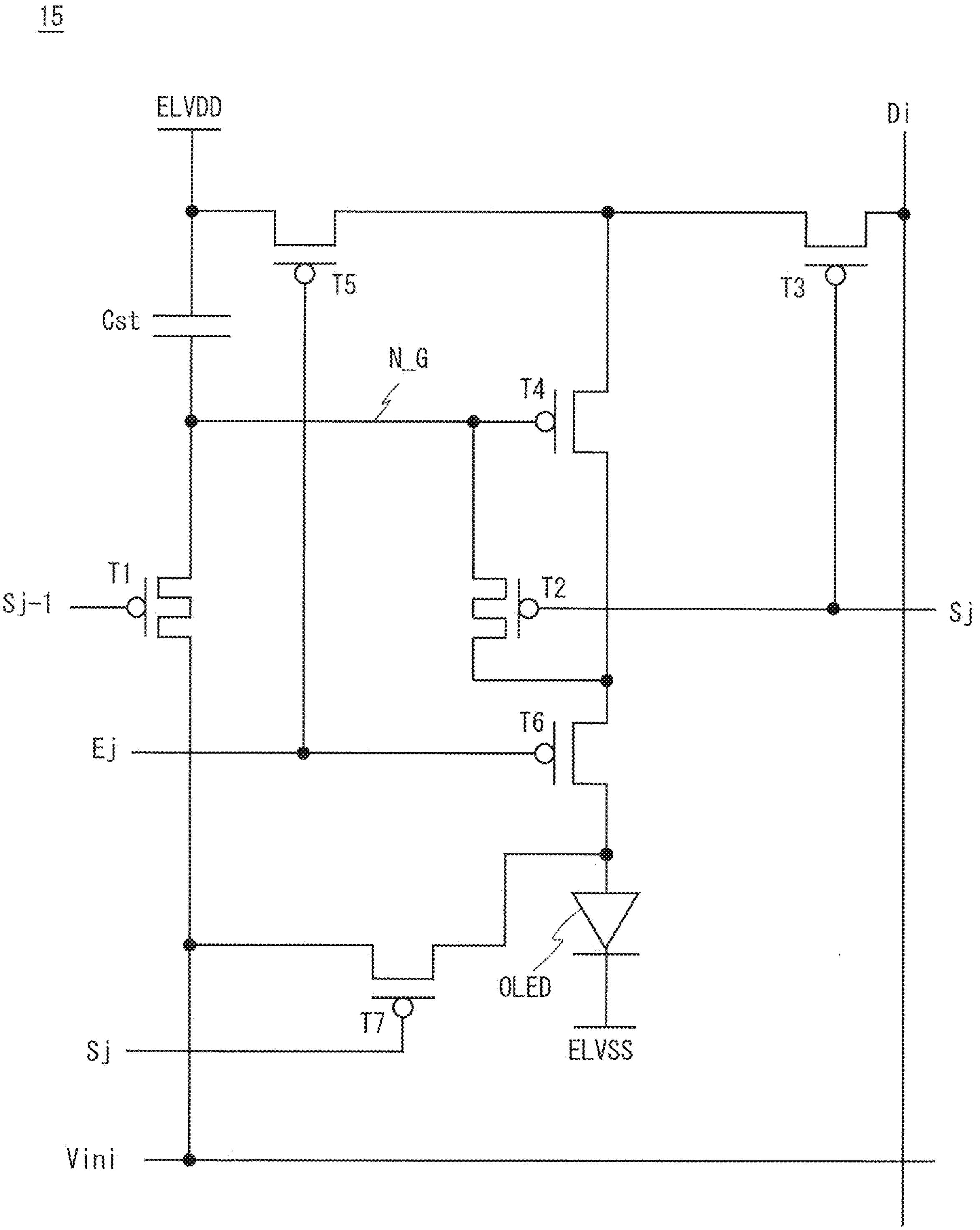
FIG. 1 is a circuit diagram illustrating the configuration of a pixel circuit used in a basic study.

Described now is the configuration of a pixel circuit 15, which includes an internal compensation circuit and is disposed in a display panel of a known organic EL display device. FIG. 1 is a circuit diagram illustrating the configuration of the pixel circuit 15 disposed in the display panel 10. As shown in FIG. 1, the pixel circuit 15 includes an organic EL element OLED, seven p-channel transistors T1 to T7, and a storage capacitor Cst (also referred to as a "capacitive element"). More specifically, the pixel circuit 15 includes a first initialization transistor T1, a compensation transistor T2, a write transistor T3, a drive transistor T4, a power supply transistor T5, an emission control transistor T6, and a second initialization transistor T7.

The drive transistor T4 has a gate terminal (also referred to as a "control terminal"), a first conductive terminal, and a second conductive terminal. The first conductive terminal of the drive transistor T4 is a conductive terminal connected to an H-level power supply line ELVDD (also referred to as a "voltage supply line", a "positive voltage supply line", or a "high voltage supply line") via the power supply transistor T5, and the second conductive terminal is a conductive terminal connected to the organic EL element OLED via the emission control transistor T6. In the case of the drive transistor T4, when holes, which are carriers, flow from the first conductive terminal to the second conductive terminal, the first conductive terminal acts as a source terminal, and the second conductive terminal acts as a drain terminal.

The pixel circuit 15 is formed on a board together with a scanning line Sj (where j is an integer such as $1 \leq j \leq n$), a preceding scanning line Sj−1 (also referred to as a "discharge line"), an emission line Ej, a data line Di (where i is an integer such as $1 \leq i \leq m$), the H-level power supply line ELVDD, an L-level power supply line ELVSS (also referred to as a "constant voltage supply line", a "negative voltage supply line", or a "low voltage supply line"), and an initialization line Vini (also referred to as a "constant voltage supply line"). The write transistor T3 is connected at a gate terminal to the scanning line Sj and at a source terminal to the data line Di, and when the scanning line Sj is selected, supplies the first conductive terminal of the drive transistor T4 with a data signal supplied to the data line Di.

The drive transistor T4 is connected at the first conductive terminal to a drain terminal of the write transistor T3 and at the gate terminal to a node N_G. The node N_G is a node where a second conductive terminal of the compensation transistor T2, which will be described later, is connected to a first terminal of the storage capacitor Cst, which is charged with a voltage of a data signal provided to the node N_G. The drive transistor T4 supplies the organic EL element OLED with a drive current determined by a voltage (also referred to as a "data voltage") corresponding to the data signal charging the storage capacitor Cst. Note that charging the storage capacitor Cst with the data voltage, as described above, is intended to mean "writing the data voltage to the storage capacitor Cst" or "writing the data voltage to the node N_G".

The compensation transistor T2 is located between the gate and second conductive terminals of the drive transistor T4. The compensation transistor T2 is connected at a gate terminal to the scanning line Sj. When the scanning line Sj is activated, the compensation transistor T2 becomes conductive, thereby diode-connecting the drive transistor T4. Consequently, the node N_G has a potential Vng lower than the data voltage by the absolute value |Vth| of a threshold voltage of the drive transistor T4, as expressed by equation (1) below. The potential Vng at the node N_G is provided to the gate terminal of the drive transistor T4 as a gate voltage.

$$Vng = \text{Vdata} - |Vth| \tag{1}$$

Here, Vdata is the data voltage, and Vth is the threshold voltage of the drive transistor T4, where Vth<0 if the drive transistor T4 is a p-channel transistor, and Vth>0 if the drive transistor T4 is an N-channel transistor.

The first transistor initialization T1 is connected at a gate terminal to the preceding scanning line Sj−1 and located between the gate terminal of the drive transistor T4 and the initialization line Vini. When the preceding scanning line Sj−1 is activated, the first initialization transistor T1 becomes conductive, thereby providing the node N_G with an initialization potential Vini and initializing the potential Vng at the node N_G. Consequently, the initialization potential Vini is provided to the gate terminal of the drive transistor T4. Note that for both the first initialization transistor T1 and the compensation transistor T2, a dual gate structure is employed to achieve a reduced leakage current.

The power supply transistor T5 is connected at a gate terminal to the emission line Ej and located between the H-level power supply line ELVDD and the first conductive terminal of the drive transistor T4. When the emission line Ej is activated, the power supply transistor T5 becomes conductive, thereby supplying the first conductive terminal of the drive transistor T4 with an H-level voltage ELVDD.

The emission control transistor T6 is connected at a gate terminal to the emission line Ej and located between the drive transistor T4 and the second initialization transistor T7. When the emission line Ej is selected, the emission control transistor T6 makes both the second conductive terminal of the drive transistor T4 and the organic EL element OLED conductive. Consequently, the drive transistor T4 supplies the organic EL element OLED with a drive current while regulating the value of the drive current.

The second initialization transistor T7 is connected at a gate terminal to the scanning line Sj and located between an anode of the organic EL element OLED and the initialization line Vini. When the scanning line Sj is selected, the second initialization transistor T7 provides the anode of the organic EL element OLED with an initialization signal DIS, thereby initializing an anode potential.

The storage capacitor Cst is connected at the first terminal to the node N_G and at a second terminal to the H-level power supply line ELVDD. The storage capacitor Cst holds the potential Vng at the node N_G when both the first initialization transistor T1 and the compensation transistor T2 are turned off.

The organic EL element OLED is connected at the anode (one terminal thereof) to the second conductive terminal of the drive transistor T4 via the emission control transistor T6 and at a cathode (the other terminal) to the L-level power supply line ELVSS, and emits light with a luminance corresponding to the value of the drive current supplied to the organic EL element OLED while being regulated by the drive transistor T4.

1.2 Afterimage Phenomenon

In the case where the drive transistor T4 is of a P-channel type, a white box pattern is displayed in an area of a black display screen for a given time period, and thereafter, the entire screen is displayed in gray. At this time, the area where the white box pattern was displayed appears lower in luminance compared to the rest of the gray display area. Such a lower-luminance box pattern is perceptible to the viewer as an afterimage.

The duration of perceiving the lower-luminance box pattern as an afterimage increases in proportion to the duration of displaying the white box pattern. For example, when the white box pattern is displayed for 60 seconds, it takes approximately 30 seconds until the afterimage disappears.

Conceivably, such an afterimage occurs in accordance with the following mechanism. During the current frame when the white box pattern is displayed, holes are trapped in trap levels formed at both grain boundaries and an interface between a channel region 42 and a gate insulation film within the p-channel drive transistor T4. Even if the white box pattern displayed in the current frame transitions to a gray display in the following frame, the trapped holes are not immediately released from the trap levels and remain in the trap levels for some time. Therefore, even if a data voltage for the gray display is applied to the gate terminal of the drive transistor T4 during the following frame, the value of a current supplied through the drive transistor T4 to the organic EL element OLED is lower than a current value determined by the data voltage. Accordingly, the area where the white box pattern was displayed appears lower in luminance compared to the rest of the gray display area. Such a lower luminance area is perceptible to the viewer as an afterimage until all the holes trapped in the trap levels are released.

Therefore, the afterimage can be made to disappear in a short period of time if it is possible to quickly release the holes trapped in the trap levels present at the grain boundaries and the interface between the channel region 42 and the gate insulation film within the drive transistor T4 while the white display is being provided. Accordingly, the following first through third embodiments will be described regarding the configuration and operation of a pixel circuit that allows quick disappearance of the afterimage by releasing the holes trapped in the trap levels.

2. First Embodiment

2.1 Configuration of Organic EL Display Device

Figure 2:
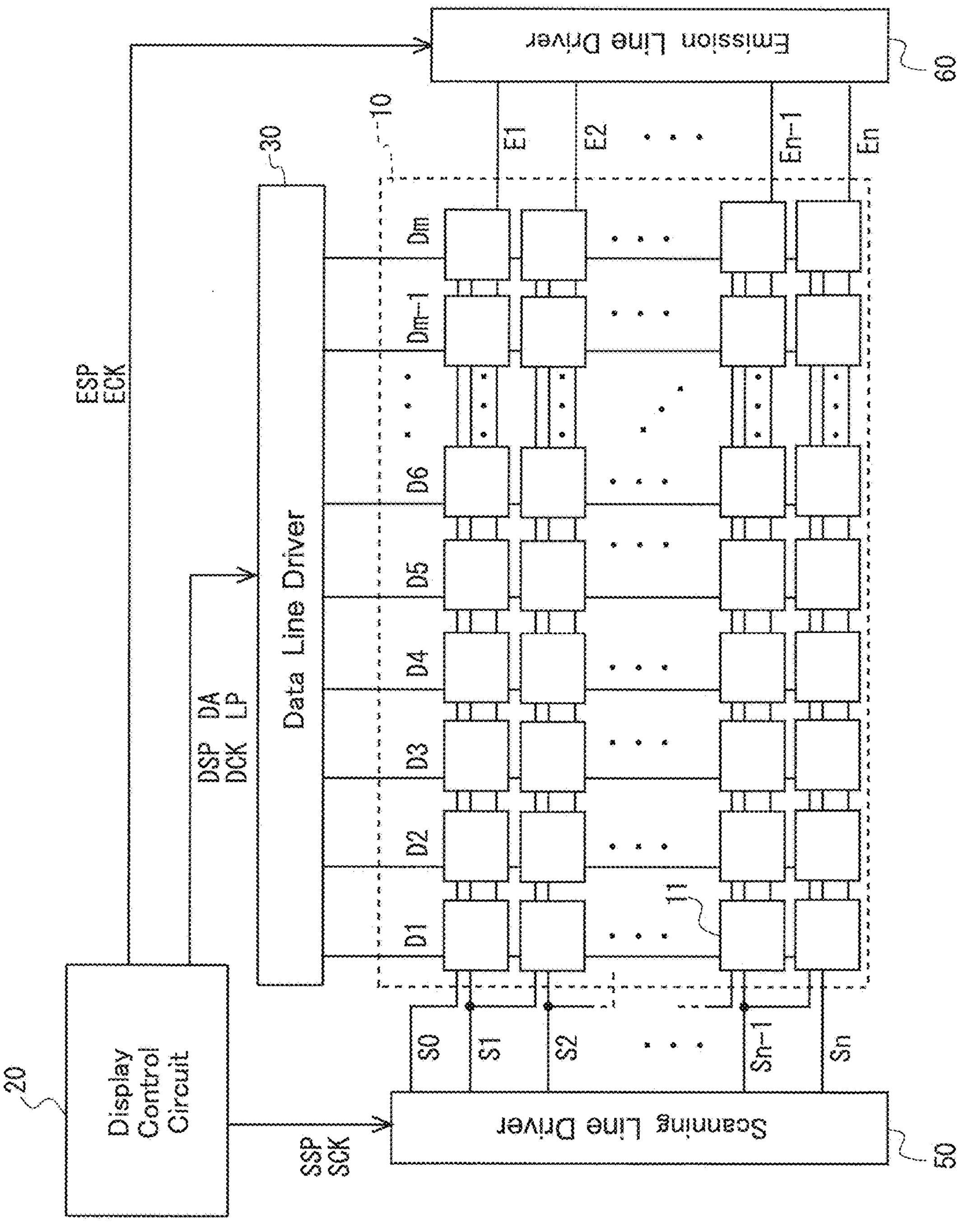
FIG. 2 is a block diagram illustrating the overall configuration of an organic EL display device according to a first embodiment.

FIG. 2 is a block diagram illustrating the overall configuration of an organic EL display device according to the first embodiment. As shown in FIG. 2, the organic EL display device (also referred to simply as the "display device") includes a display panel 10, a display control circuit 20, a data line driver 30, a scanning line driver 50, and an emission line driver 60. In the organic EL display device shown in FIG. 2, the data line driver 30 directly supplies each data line with a data signal. In the present embodiment, the data line driver 30 realizes a data line driver circuit, the scanning line driver 50 realizes a scanning line driver circuit, and the emission line driver 60 realizes an emission control line driver circuit.

Figure 3:
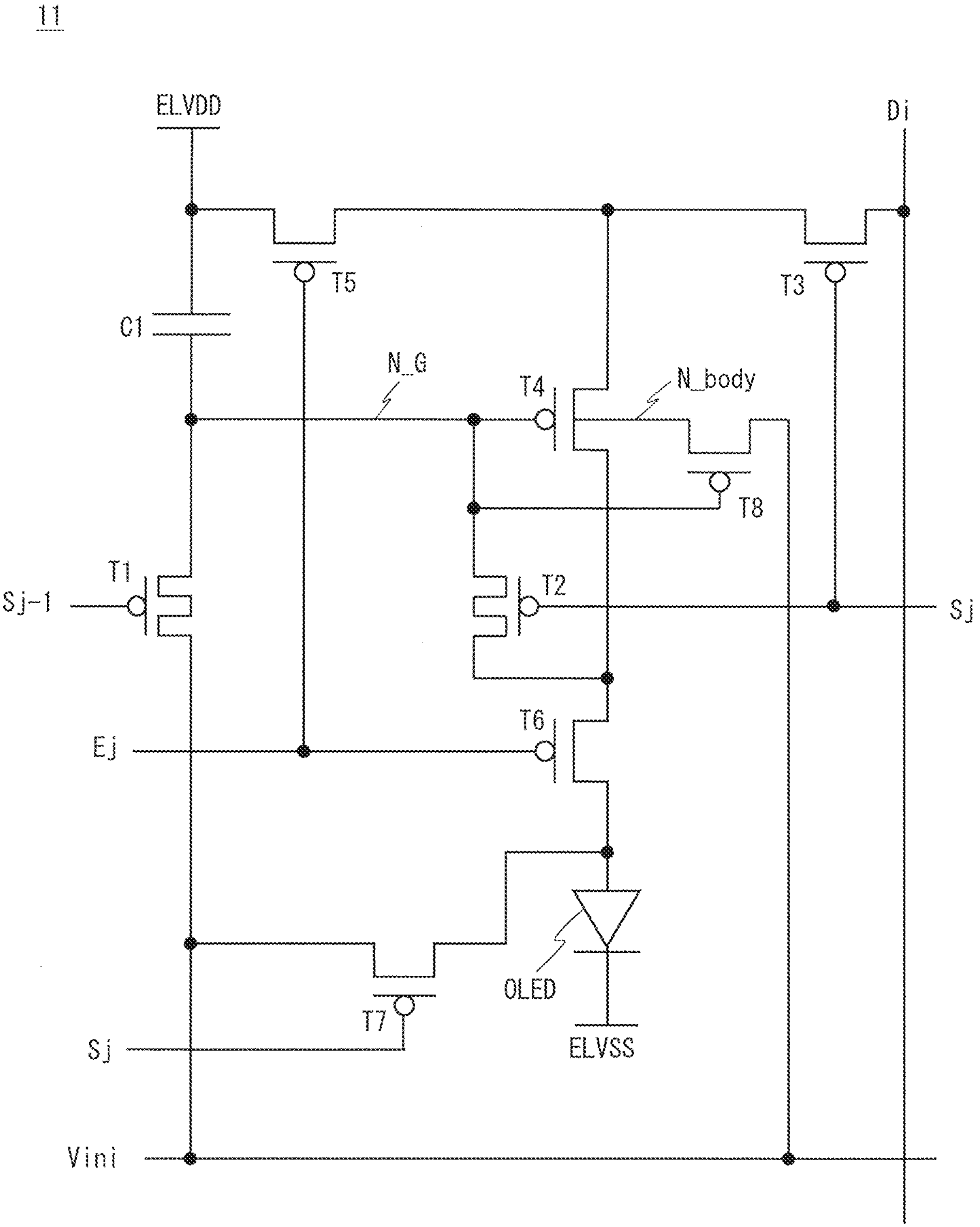
FIG. 3 is a circuit diagram illustrating the configuration of a pixel circuit included in the organic EL display device according to the first embodiment.

The display panel 10 has m (where m is an integer of 2 or more) data lines D1 to Dm and n+1 (where n is an integer of 2 or more) scanning lines S0 to Sn arranged therein. Moreover, the display panel 10 is provided with m×n pixel circuits 11 at respective crossing points of the m data lines D1 to Dm and the n scanning lines S1 to Sn. Accordingly, each pixel circuit 11 corresponds to one of the m data lines D1 to Dm, and also to one of the n scanning lines S1 to Sn. Note that in addition to the corresponding scanning line Sj (where 1≤j≤n), each pixel circuit 11 is also connected to the scanning line Sj−1 immediately preceding the corresponding scanning line Sj, as shown in FIG. 3 to be described later. In each pixel circuit 11, the corresponding scanning line Sj is used for controlling data voltage writing, and the immediately preceding scanning line Sj−1 is used for controlling data voltage initialization (potential initialization at the node N_G to be described later) (details will be provided later).

The display panel 10 further has n emission lines E1 to En arranged parallel to the n scanning lines S1 to Sn and serving as emission control lines. The m data lines D1 to Dm are disposed to cross both the n scanning lines S1 to Sn and the n emission lines E1 to En, and are connected to the data line driver 30. The n scanning lines S1 to Sn are connected to the scanning line driver 50. The n emission lines E1 to En are connected to the emission line driver 60. The n emission lines E1 to En correspond to their respective scanning lines S1 to Sn, and each pixel p circuit 11 corresponds to one of the n emission lines E1 to En.

Furthermore, the display panel 10 has common power supply lines (not shown) arranged for the pixel circuits 11. More specifically, these are power supply lines respectively supplying H-level and L-level voltages ELVDD and ELVSS to drive organic EL elements (also referred to as "light-emitting display elements") to be described later (the power supply lines will be referred to below as the "H-level power supply line" and the "L-level power supply line" and denoted by ELVDD and ELVSS, the same symbols as those for H-level and L-level potentials). Also arranged is an initialization line for supplying an initialization potential Vini to be used for an initialization operation to be described later (the initialization line will be denoted by Vini, the same symbol as that for the initialization potential). These potentials are supplied by an unillustrated power supply circuit.

The display control circuit 20 outputs various control signals to the data line driver 30, the scanning line driver 50, and the emission line driver 60. More specifically, the display control circuit 20 outputs a data start pulse DSP, a data clock DCK, display data DA, and a latch pulse LP to the data line driver 30. The display control circuit 20 also outputs a scanning start pulse SSP and a scanning clock SCK to the scanning line driver 50. Further, the display control circuit 20 also outputs an emission start pulse ESP and an emission clock ECK to the emission line driver 60.

The data line driver 30 includes unillustrated components such as an m-bit shift register, a sampling circuit, a latch circuit, and m D/A converters. The shift register has m bistable circuits cascaded to one another and is configured such that the data start pulse DSP supplied to the first stage is transferred in synchronization with the data clock DCK, and each stage outputs a sampling pulse. In accordance with the output timing of the sampling pulse, the display data DA is supplied to the sampling circuit. The sampling circuit stores the display data DA in accordance with the sampling pulse. Once the sampling circuit stores the display data DA for one row, the display control circuit 20 outputs the latch pulse LP to the latch circuit. The latch circuit receives the latch pulse LP and then holds the display data DA stored in the sampling circuit. The D/A converters correspond to the m data lines D1 to Dm, which are respectively connected to m output terminals (not shown) of the data line driver 30, and is configured to convert the display data DA held in the latch circuit into data signals, which are analog signal voltages, and output the resultant data signals to the data lines D1 to Dm, respectively.

The scanning line driver 50 drives the n scanning lines S1 to Sn. More specifically, the scanning line driver 50 includes unillustrated components such as a shift register and a buffer. The shift register is configured to sequentially transfer the scanning start pulse SSP in synchronization with the scanning clock SCK. Scanning signals are outputted from stages of the shift register and supplied sequentially to their respectively corresponding scanning lines S1 to Sn by way of the buffer. Each active (in the present embodiment, low-level) scanning signal causes collective selection of pixels formed by the m pixel circuits 11 connected to the scanning line Sj.

The emission line driver 60 is configured to drive the n emission lines E1 to En. More specifically, the emission line driver 60 includes unillustrated components such as a shift register and a buffer. The shift register is configured to sequentially transfer the emission start pulse ESP in synchronization with the emission clock ECK. Emission signals are outputted from stages of the shift register and supplied to their respectively corresponding emission lines Ej (where j=1 to n) by way of the buffer.

In the organic EL display device exemplified by FIG. 2, the scanning line driver 50 is disposed on one side of the display panel 10 (in FIG. 2, to the left of the display panel 10), and the emission line driver 60 is disposed on the other side of the display panel 10 (in FIG. 2, to the right of the display panel 10), but this arrangement of the scanning line driver 50 and the emission line driver 60 is not restrictive. For example, a both-sided input structure may be employed by disposing both the scanning line driver 50 and the emission line driver 60 on each side of the display panel 10. Moreover, to reduce the number of output terminals of the data line driver 30, a demultiplexer portion may be provided between the data line driver 30 and the pixel circuits 11. In this case, the data line driver 30 is driven using an SSD (source shared driving) method to supply an output data signal to each data line through the demultiplexer portion.

2.2 Configuration of Pixel Circuit

The configuration of the pixel circuit 11 formed in the display panel 10 will now be described. FIG. 3 is a circuit diagram illustrating the configuration of the pixel circuit 11. The pixel circuit 11 shown in FIG. 3 is configured by additionally providing a p-channel switching transistor T8 to the pixel circuit 15 shown in FIG. 1. The switching transistor T8 is connected at a source terminal to a body terminal (also referred to as a "body terminal N_body"), which is a channel region of the drive transistor T4, at a drain terminal to the initialization line Vini with a negative potential, and at a gate terminal to the node N_G. Other than the above, the pixel circuit 11 has the same configuration as that of the pixel circuit 15 and therefore will not be elaborated upon.

2.3 Layout Pattern Surrounding Switching Transistor

Figure 4:
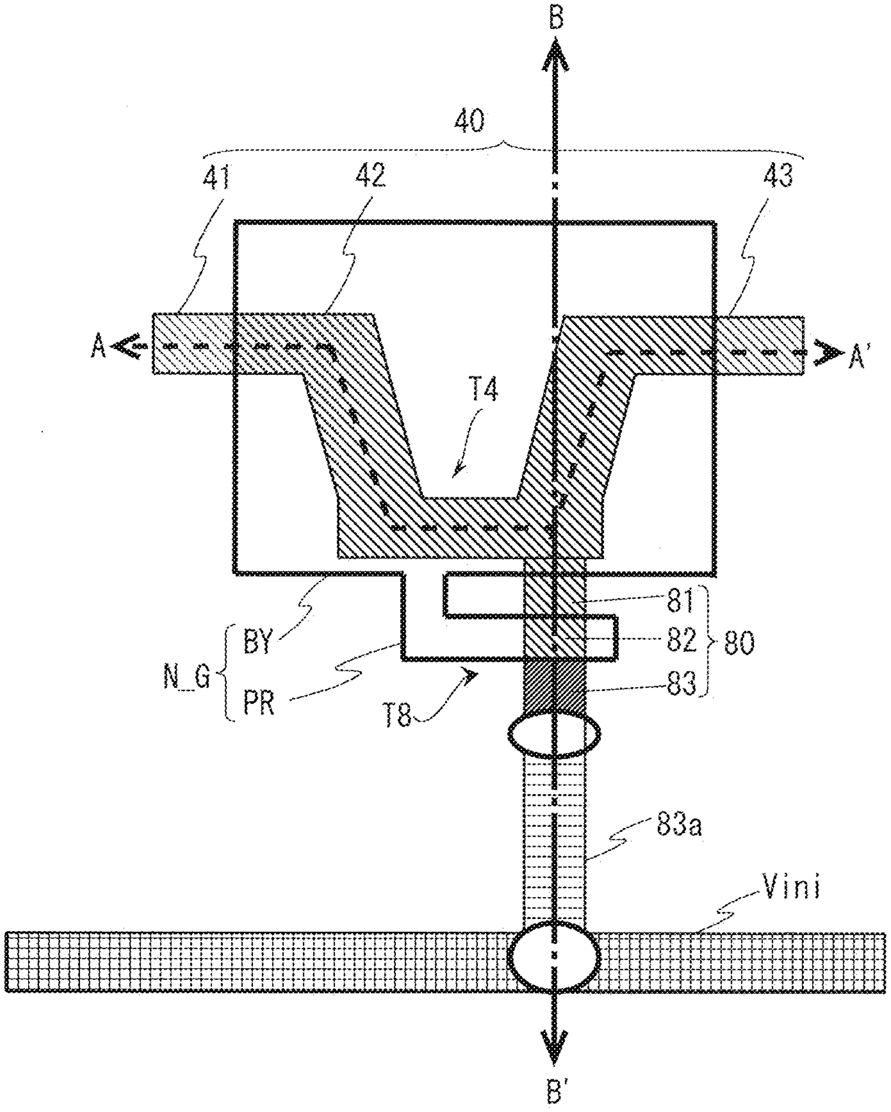
FIG. 4 is a diagram illustrating a layout pattern of a drive transistor, a switching transistor, and their surroundings within the pixel circuit shown in FIG. 3.

FIG. 4 is a diagram illustrating a layout pattern of the drive transistor T4, the switching transistor T8, and their surroundings within the pixel circuit 11. Note that the following descriptions of the layout pattern and cross-sectional views use the terms "gate electrode", "source region", "drain region", and "channel region" instead of the terms used for the circuit described above, "gate terminal", "source terminal", "drain terminal", and "body terminal", respectively.

As shown in FIG. 4, the drive transistor T4 includes a semiconductor layer 40 (also referred to as a "first semiconductor layer") consisting of a source region 41 (also referred to as a "first source region"), a channel region 42 (also referred to as a "first channel region"), and a drain region 43 (also referred to as a "first drain region"). The source region 41 is connected to the write transistor T3 (not shown) and the power supply transistor T5 (not shown). The drain region 43 is connected to the compensation transistor T2 (not shown) and the emission control transistor T6 (not shown) and also to the anode electrode (not shown) of the organic EL element OLED via the emission control transistor T6 (not shown).

The switching transistor T8 includes a semiconductor layer 80 (also referred to as a "second semiconductor layer") extending downward from the channel region 42 (also referred to as the "first channel region") of the drive transistor T4 in FIG. 4, and the semiconductor layer 80 consists of, from the closest end to the channel region 42 of the drive transistor T4, a source region 81 (also referred to as a "second source region"), a channel region 82 (also referred to as a "second channel region"), and a drain region 83 (also referred to as a "second drain region"). The source region 81 of the switching transistor T8 is connected to the channel region of the drive transistor T4, and the drain region 83 is connected to the initialization line Vini.

The node N_G functions as the gate electrode of the drive transistor T4 and also as the first terminal of the storage capacitor Cst for data voltage charging. The node N_G consists of a rectangular body portion BY (also referred to as a "nodal body portion") covering the channel region 42 of the drive transistor T4 and a protruding portion PR branching out from the body portion BY as far as being located over the channel region 82 of the switching transistor T8. The body portion BY functions as a gate electrode for regulating a drive current flowing through the drive transistor T4, and the protruding portion PR functions as a gate electrode for regulating a current flowing through the switching transistor T8.

It should be noted that known transistors use low-temperature polycrystalline silicon (LTPS) films as semiconductor layers. However, recent years have seen the development of LTPO (low-temperature polycrystalline oxide) technology using bilayered semiconductor layers consisting of a low-temperature polysilicon film as a lower layer and an oxide semiconductor film, such as IGZO (indium gallium zinc oxide), as an upper layer. Accordingly, in each embodiment described herein, LTPO technology may be employed instead of simply using the low-temperature polysilicon film. This makes it possible to form a pixel circuit that takes advantage of the characteristics of both the IGZO and LTPS films by using, for example, IGZO films for transistors (such as T1, T2, and T7) desired to have less leakage current and LTPS films for transistors (such as T3, T4, T5, and T6) required to have driving capability. Note that the semiconductor layers configured as described above for use in the transistors are also used in each embodiment to be described later.

Figure 5:
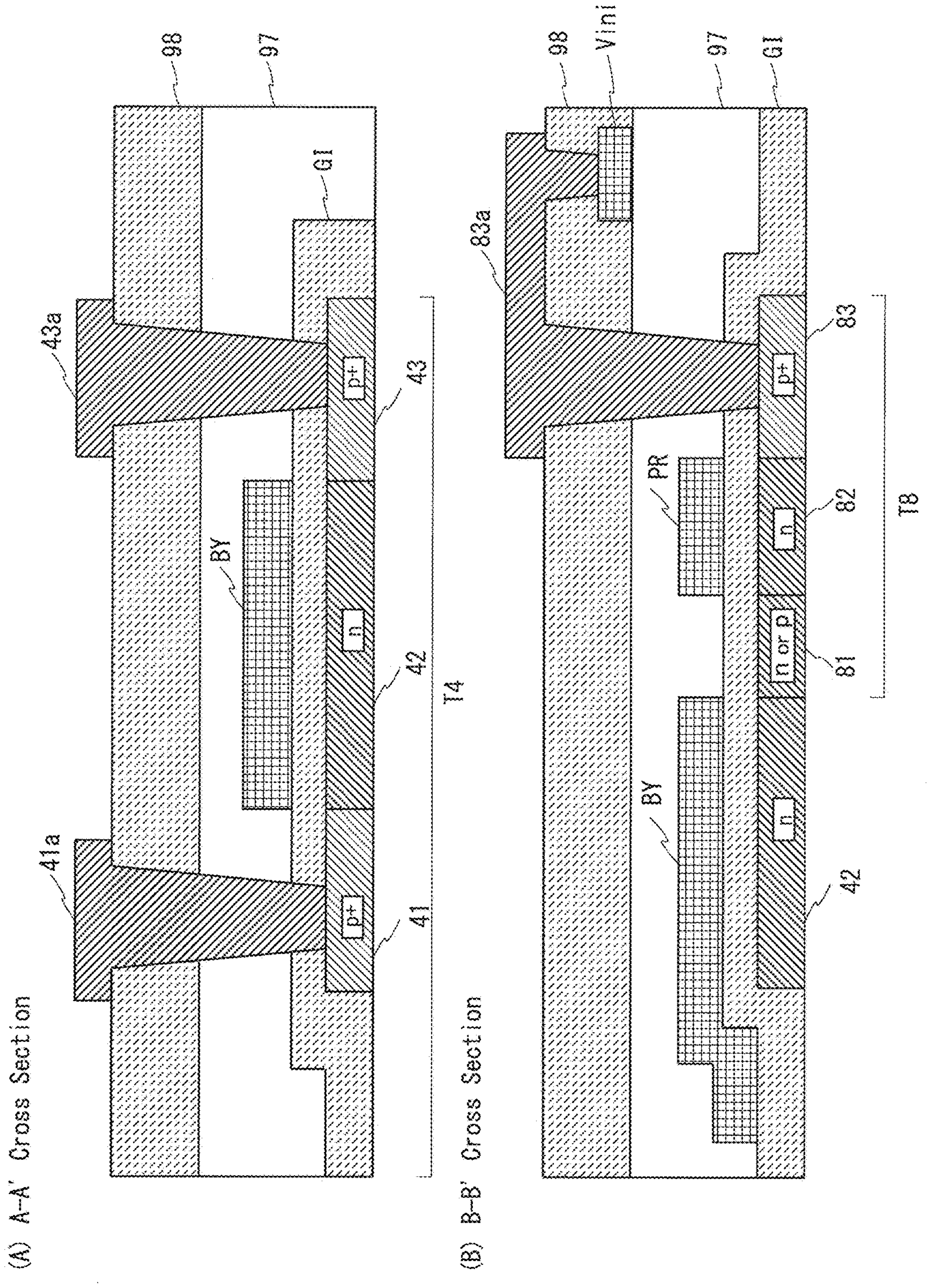
FIG. 5 provides cross-sectional views of the layout pattern shown in FIG. 4; more specifically, (A) of FIG. 5 is a cross-sectional view of the drive transistor taken along arrow line A-A' shown in FIG. 4, and (B) of FIG. 5 is a cross-sectional view of the switching transistor taken along arrow line B-B' shown in FIG. 4.

FIG. 5 provides cross-sectional views of the layout pattern shown in FIG. 4; more specifically, (A) of FIG. 5 is a cross-sectional view of the drive transistor T4 taken along arrow line A-A' shown in FIG. 4, and (B) of FIG. 5 is a cross-sectional view of the switching transistor T8 taken along arrow line B-B' shown in FIG. 4. Since the drive transistor T4 is of a p-channel type, the source region 41 and the drain region 43 are p+-type regions doped with p-type impurities, and the channel region 42 is an n-type region, as shown in (A) of FIG. 5. The body portion BY, which functions as the gate electrode, is located above the channel region 42 with a gate insulation film GI sandwiched therebetween.

The switching transistor T8 is also of a p-channel type, and therefore the source region 81 and the drain region 83 are usually formed as p-type regions doped with p-type impurities, but the source region 81 may be an n-type (n+ or intrinsic) region doped with n-type impurities, and the drain region 83 may be a p+-type region doped with p-type impurities, as shown in (B) of FIG. 5. The channel region 82 is an n-type region. The source region 81 is connected to the channel region 42 of the drive transistor T4. The protruding portion PR, which branches out from the body portion BY and functions as the gate electrode, is located above the channel region 82 with the gate insulation film GI sandwiched therebetween. The drain region 83 is connected to the initialization line Vini.

2.4 Operation of Pixel Circuit

Figure 6:
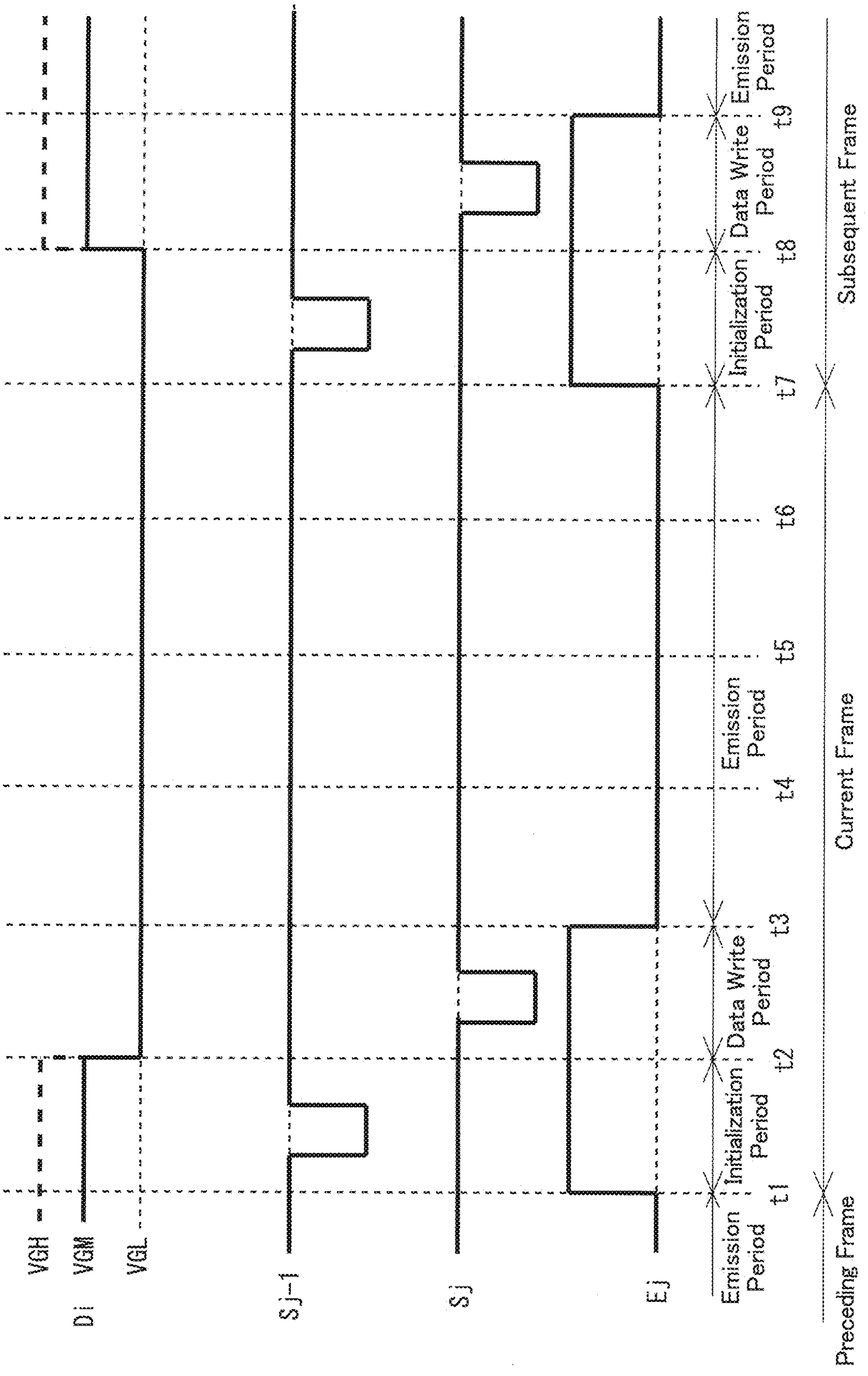
FIG. 6 is a timing chart illustrating the operation of the pixel circuit shown in FIG. 3 where a white display voltage is written to the pixel circuit.
Figure 7:
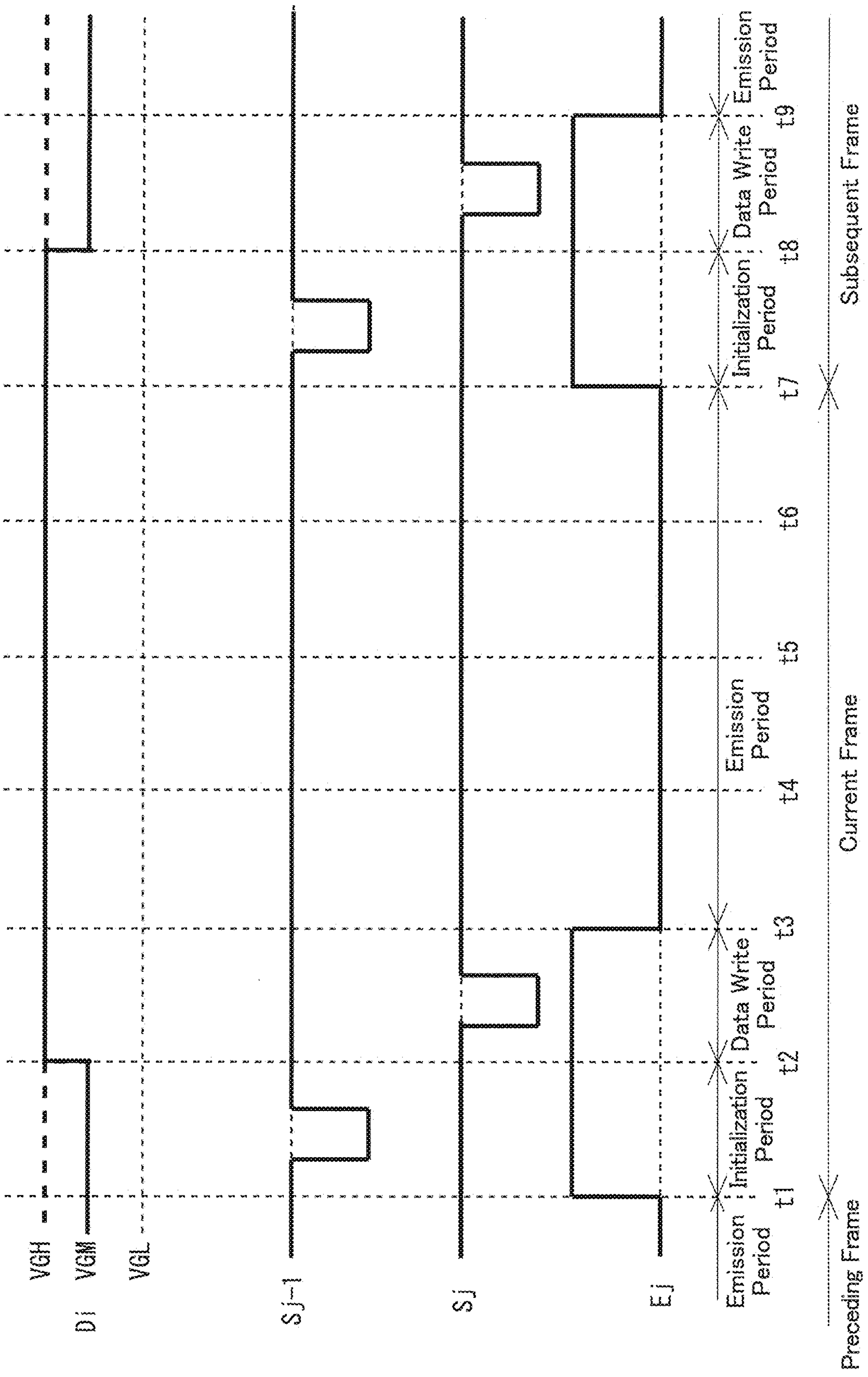
FIG. 7 is a timing chart illustrating the operation of the pixel circuit shown in FIG. 3 where a black display voltage is written to the pixel circuit.

FIGS. 6 and 7 are diagrams providing timing charts representing the operation of the pixel circuit 11. As shown in FIGS. 6 and 7, these timing charts are divided into a preceding frame up until time t1, a current frame from time t1 to time t7, and a subsequent frame from time t7 onward. Moreover, the current frame is divided into an initialization period from time t1 to time t2, a data write period from time t2 to time t3, and an emission period from time t3 to time t7.

During the emission period within the preceding frame, the preceding scanning line Sj−1 and the scanning line Sj are at H level (high level), and the emission line Ej is at L level (low level). Note that the level of a data voltage applied to the data line Di ranges from an H level (VGH) representing a black display voltage, which is a data voltage indicating a minimum display luminance (the H level will also be referred to as the "black display voltage"), to an L level (VGL) representing a white display voltage, which is a data voltage indicating a maximum display luminance (the L level will also be referred to as the "white display voltage"), i.e., the data voltage can take a value within that range (including an M level (VGM) representing a gray display voltage at the midpoint between these levels (the M level will also be referred to as the "gray display voltage")). Note that in the present application, for simple descriptions, data voltages are assumed to be represented by the three levels:

the H level including voltages close to the black display voltage, the L level including voltages close to the white display voltage, and the M level including voltages between the voltages close to the black display voltage and the voltages close to the white display voltage.

At time t1 when the preceding frame transitions to the current frame, the emission line Ej undergoes an L to H level potential change. Correspondingly, the power supply transistor T5 and the emission control transistor T6 are turned off, resulting in no current t flow to the drive transistor T4. Thereafter, during the period up until time t2, the preceding scanning line Sj−1 undergoes an H to L level potential change, with the result that the first initialization transistor T1 is turned on, and the potential Vng at the node N_G is set to the initialization potential Vini. Subsequently, the potential on the preceding scanning line Sj−1 returns from L to H level, with the result that the first initialization transistor T1 is turned off, and the node N_G holds the potential Vng at the initialization potential Vini.

2.4.1 Case Where Data Voltage Changes from H or M Level to L Level or Remains at L Level Described below is a case where the data voltage changes from either the H or M level to the L level, or remains at the L level, at time t2, as shown in FIG. 6. At time t2, the data voltage being applied to the data line Di changes from either the H or M level to the L level or remains at the L level. Thereafter, during the period up until time t3, the scanning line Sj undergoes an H to L level potential change. Correspondingly, the write transistor T3 and the compensation transistor T2 are turned on, with the result that the L-level data voltage is written to the node N_G and undergoes threshold compensation regarding the drive transistor T4. Subsequently, the potential on the scanning line Sj returns from L to H level, with the result that the write transistor T3 and the compensation transistor T2 are turned off, and the node N_G has the potential Vng as expressed by the following equation.

$$V_{ng} = \mathrm{Vdata} - |V_{th}|$$

Here, once the white display voltage is applied to the gate electrode of the drive transistor T4, holes are cumulatively trapped in trap levels within the channel region 42. The trapped holes cause an afterimage perceptible to the viewer during the subsequent frame. However, in the present embodiment, the transistor T8 is turned on at the instant when the data voltage being written to the node N_G transitions to the L level, with the result that holes being trapped in trap levels at grain boundaries and the interface between the channel region 42 and the gate insulation film are released through the transistor T8 to the initialization line Vini. Consequently, during the subsequent frame, the occurrence of an afterimage phenomenon due to the trapped holes can be inhibited.

At time t3, the emission line Ej undergoes an H to L level potential change. Correspondingly, the emission control transistor T6 and the power supply transistor T5 are turned on, with the result that the organic EL element OLED is supplied with a current from the H-level power supply line ELVDD through the power supply transistor T5, the drive transistor T4, and the emission control transistor T6 in this order. At this time, the drive transistor T4 supplies the organic EL element OLED with the current flowing through the power supply transistor T5 thereto, while regulating the current with the white display voltage Vdata (W) written in the node N_G. Consequently, the organic EL element OLED emits light, and the pixel circuit 11 presents a white display image. Thereafter, the current continues to flow to the organic EL element OLED until time t7, and the pixel circuit 11 continues to present the white display image.

The subsequent frame starts at time t7. At time t7, the potential on the emission line Ej changes from L to H level. Correspondingly, the emission control transistor T6 and the power supply transistor T5 are turned off, resulting in no current supply to the organic EL element OLED, and therefore the organic EL element OLED stops emitting light. Thereafter, during the period up until time t8, the preceding scanning line Sj−1 undergoes an H to L level potential change, with the result that the first initialization transistor T1 is turned on. Correspondingly, the potential Vng at the node N_G is initialized to the initialization potential Vini. Moreover, the potential on the preceding scanning line Sj−1 returns from L to H level, with the result that the first initialization transistor T1 is turned off. Consequently, the node N_G holds the initialization potential Vini.

At time t8, the data voltage being applied to the data line Di changes from the L to the M level. Thereafter, during the period up until time t9, the potential on the scanning line Sj changes from H to L level. Correspondingly, the write transistor T3 and the compensation transistor T2 are turned on, with the result that the M-level data voltage is written to the node N_G and undergoes threshold compensation regarding the drive transistor T4.

Here, in the case of the known pixel circuit 15 shown in FIG. 1, holes are trapped in trap levels within the channel region 42 during the period from time t2 to time t3 within the current frame. There is no mechanism provided to actively release the trapped holes, and therefore the trapped holes are less likely to be released from time t2 onward, leaving some holes unreleased (because the release of the trapped holes occurs slowly in accordance with a time constant of the order of milliseconds or more). Accordingly, from time t8 onward within the subsequent frame, fewer carriers (i.e., less current) are induced within the channel region 42 than those corresponding to the M-level data voltage written in the node N_G. Consequently, the viewer perceives an image with a reduced luminance (i.e., an afterimage).

On the other hand, in the case of the pixel circuit 11 according to the present embodiment shown in FIG. 3, the switching transistor T8 remains on from time t2 to time t7, with the result that the holes trapped in the trap levels within the channel region 42 are released through the switching transistor T8 to the initialization line Vini. At time t8 within the subsequent frame, carriers (current) are induced within the channel region 42 in accordance with the M-level data voltage written in the node N_G. Accordingly, the occurrence of an afterimage due to the trapped holes can be inhibited. Subsequently, during the period up until time t9, the potential on the scanning line Sj returns from L to H level, with the result that the write transistor T3 and the compensation transistor T2 are turned off.

At time t9, the potential on the emission line Ej changes from H to L level. Correspondingly, the power supply transistor T5 and the emission control transistor T6 are turned on, with the result that the organic EL element OLED is supplied with a current from the H-level power supply line ELVDD through the power supply transistor T5, the drive transistor T4, and the emission control transistor T6 in this order. In this case, as the current flows from the H-level power supply line ELVDD through the power supply transistor T5 to the drive transistor T4, the drive transistor T4 regulates the current with the data voltage for the gray display written in the node N_G.

As described above, in the case of the pixel circuit 11, when the data voltage changes from either the H or M level to the L level, or remains at the L level, at time t2, the switching transistor T8 remains on during the period from time t3 to time t7 within the current frame. Correspondingly, the holes trapped in the trap levels within the channel region 42 are discharged through the switching transistor T8 to the initialization line Vini. Consequently, from time t8 onward, carriers (current) are induced within the channel region 42 in accordance with the desired M-level data voltage. In this manner, the afterimage phenomenon is inhibited, with the result that the organic EL element OLED emits light with a luminance corresponding to the data voltage, and the pixel circuit 11 presents a desired gray display image. Thereafter, the desired current continues to flow to the organic EL element OLED, with the result that the organic EL element OLED continues to emit light with the desired luminance corresponding to the data voltage, and the pixel circuit 11 provides the gray display.

2.4.2 Case Where Data Voltage Changes from Either M or L Level to H Level or Remains at H Level Described next is a case where the data voltage changes from either the M or L level to the H level, or remains at the H level, at time t2, as shown in FIG. 7. At time t2, the data voltage being applied to the data line Di changes from either the M or L level to the H level or remains at the H level. Thereafter, during the period up until time t3, the scanning line Sj undergoes an H to L level potential change. Correspondingly, the write transistor T3 and the compensation transistor T2 are turned on, with the result that the H-level data voltage is written to the node N_G and undergoes threshold compensation regarding the drive transistor T4. Subsequently, the potential on the scanning line Sj returns from L to H level, with the result that the write transistor T3 and the compensation transistor T2 are turned off.

Here, if the black display voltage is applied to the gate electrode of the drive transistor T4, the data voltage being written to the node N_G transitions to the H level, with the result that the switching transistor T8 is turned off. Consequently, the channel region 42 of the drive transistor T4 is disconnected from the initialization line Vini. Note that the black display voltage causes fewer holes to be trapped in trap levels, and therefore even if the trapped holes are not discharged to the initialization line Vini, the holes left trapped lead to almost no perceptible afterimage (luminance reduction), but on the other hand, electrons are more significantly trapped in trap levels, resulting in a perceptible afterimage (luminance increase). Moreover, if the aim is to simply discharge holes upon the application of the black display voltage, the switching transistor T8 may be of either an n-channel type or a p-channel type.

As the emission period of the current frame starts at time t3, the emission line Ej undergoes an H to L level potential change. Correspondingly, the power supply transistor T5 and the emission control transistor T6 are turned on, with the result that the organic EL element OLED is supplied with a current from the H-level power supply line ELVDD through the power supply transistor T5, the drive transistor T4, and the emission control transistor T6 in this order. In this case, as the current flows from the H-level power supply line ELVDD through the power supply transistor T5 to the drive transistor T4, the drive transistor T4 regulates the current with the data voltage for the black display written in the node N_G. Consequently, the organic EL element OLED continues to emit light with a luminance corresponding to the data voltage, and the pixel circuit 11 provides the black display.

The subsequent frame starts at time t7. At time t7, the potential on the emission line Ej changes from L to H level. Correspondingly, the emission control transistor T6 and the power supply transistor T5 are turned off, resulting in no current supply to the organic EL element OLED, and therefore the organic EL element OLED stops emitting light. Thereafter, during the period up until time t8, the preceding scanning line Sj−1 undergoes an H to L level potential change, with the result that the first initialization transistor T1 is turned on. Consequently, the potential Vng at the node N_G is initialized to the initialization potential Vini. Moreover, the potential on the preceding scanning line Sj−1 returns from L to H level, with the result that the first initialization transistor T1 is turned off. Consequently, the node N_G holds the initialization potential Vini.

At time t8, the data voltage being applied to the data line Di changes from the H to the M level. Thereafter, during the period up until time t9, the potential on the scanning line Sj changes from H to L level. Correspondingly, the write transistor T3 and the compensation transistor T2 are turned on, with the result that the M-level data voltage is written to the node N_G and undergoes threshold compensation regarding the drive transistor T4.

In the case of the known pixel circuit 15 shown in FIG. 1, electrons are trapped in trap levels within the channel region 42 during the period from time t2 to time t3 within the current frame. There is no mechanism provided to actively release the trapped electrons, and therefore from time t2 onward, the trapped electrons are less likely to be released, leaving some electrons unreleased (because the release occurs slowly in accordance with a time constant of the order of milliseconds or more). Accordingly, from time t8 onward within the subsequent frame, more carriers (i.e., more current) are induced within the channel region 42 than those corresponding to the M-level data voltage written in the node N_G. Consequently, the viewer perceives an image with an increased luminance (i.e., an afterimage).

On the other hand, in the case of the pixel circuit 11 according to the present embodiment shown in FIG. 3, the switching transistor T8 remains on from time t2 to time t7, but the power supply line connected thereto is the initialization line Vini with a negative potential, and therefore the electrons trapped in the trap levels within the channel region 42 are left undischarged. Accordingly, from time t8 onward within the subsequent frame, more carriers (i.e., more current) are induced within the channel region 42 than those corresponding to the M-level data voltage written in the node N_G. Consequently, as in the case of the known pixel circuit 15, the viewer perceives an image with an increased luminance (i.e., an afterimage). Subsequently, during the period up until time t9, the potential on the scanning line Sj returns from L to H level, with the result that the write transistor T3 and the compensation transistor T2 are turned off.

At time t9, the potential on the emission line Ej changes from H to L level. Correspondingly, the power supply transistor T5 and the emission control transistor T6 are turned on, with the result that the organic EL element OLED is supplied with a current from the H-level power supply line ELVDD through the power supply transistor T5, the drive transistor T4, and the emission control transistor T6 in this order. In this case, as the current flows from the H-level power supply line ELVDD through the power supply transistor T5 to the drive transistor T4, the drive transistor T4 regulates the current with the data voltage for the gray display written in the node N_G.

As described above, in the case of the pixel circuit 11, when the data voltage changes from either the M or L level to the H level, or remains at the H level, at time t2, the switching transistor T8 remains on during the period from time t2 to time t7 within the current frame, but the power supply line connected thereto is the negative-potential initialization line Vini, and therefore the electrons trapped in the trap levels within the channel region 42 are left undischarged. Accordingly, from time t8 onward within the subsequent frame, more carriers (i.e., more current) are induced within the channel region 42 than those corresponding to the desired M-level data voltage. This does not inhibit an afterimage phenomenon, with the result that at the instant of switching to the gray display, the organic EL element OLED emits light with a luminance higher than that corresponding to the data voltage, and the pixel circuit 11 displays a brighter image than the desired gray display. Thereafter, the trapped electrons are released gradually (and slowly in accordance with a time constant), and therefore the luminance of the organic EL element OLED decreases little by little to a desired value corresponding to the desired M-level data voltage in several tens of seconds, thereby ultimately providing the desired gray display free of an afterimage.

2.5 Operation of Switching Transistor

2.5.1 Case Where L-Level White Display Voltage Is Written to Node N_G

When the threshold voltage of the drive transistor T4 is compensated for by writing the L-level white display voltage Vdata (W) to the node N_G during the current frame, holes are trapped in trap levels within the channel region of the drive transistor T4. Therefore, to discharge the trapped holes through the p-channel switching transistor T8 to the initialization line Vini, the switching transistor T8 needs to be turned on. The requirement for turning on the p-channel switching transistor T8 is as follows.

$$Vth(T8) > Vgs$$

Here, Vgs is a gate-source voltage of the switching transistor T8 as expressed by the following equation.

$$\begin{aligned} Vgs &= Vng - \text{Vbody} \\ &= \text{Vdata}(W) - |Vth\ (T4)| - \text{Vbody} \\ &= \text{Vdata}(W) + Vth\ (T4) - \text{Vbody} \end{aligned}$$

Accordingly, the requirement for turning on the switching transistor T8 can be expressed as follows.

$$Vth(T8) > \text{Vdata}(W) + Vth(T4) - \text{Vbody} \tag{2}$$

To turn on the switching transistor T8, the threshold voltage Vth (T4) of the drive transistor T4, the threshold voltage Vth (T8) of the switching transistor T8, and the white display voltage Vdata (W) are set to satisfy equation (2) above. Exemplary voltage settings are as follows:

$$\begin{aligned} V\text{data}(W) &= 2\text{V} \\ ELVDD &= 4\text{V} \\ ELVSS &= -4\text{V} \\ \text{Voled} &= 3\text{V} \\ \text{Vbody} &\approx \{(ELVDD - ELVSS) - \text{Voled}\}/2 \\ &= 2.5\text{V} \\ Vini &= -3\text{V} \\ Vth(T4) &= -4\text{V} \\ Vth(T8) &= -2\text{V} \end{aligned}$$

Here, the left-hand side of equation (2) is as follows:

$$Vth(T8) = -2\ \text{V}$$

and the right-hand side of equation (2) is as follows:

$$\begin{aligned} \text{Vdata}(W) + Vth(T4) - \text{Vbody} &= 2\text{V} + (-4\text{V}) - (2.5\text{V}) \\ &= -4.5\text{V} \end{aligned}.$$

Thus, equation (2) is satisfied. Accordingly, the switching transistor T8 is turned on, with the result that the holes trapped in the trap levels within the channel region of the drive transistor T4 are discharged through the switching transistor T8 to the initialization line Vini. Consequently, when the current frame provides the white display, no afterimage occurs (i.e., no dark white display portion appears) upon the gray display during the subsequent frame. However, when the threshold voltages and the power supply voltage are not set to satisfy equation (2), the switching transistor T8 is not turned on, with the result that an afterimage might occur even when the current frame provides the white display.

2.5.2 Case Where H-Level Black Display Voltage Is Written to Node

When the H-level black display voltage Vdata (B) is written during the current frame, electrons are trapped in trap levels within the channel region of the drive transistor T4. In this case, the requirement for turning on the p-channel switching transistor T8 can be similarly expressed by the following equation, as in the case of equation (2).

$$Vth(T8) > Vgs$$

In this case, $$\begin{aligned} Vgs &= Vng - \text{Vbody} \\ &= \text{Vdata}(B) - |Vth(T4)| - \text{Vbody}. \\ &= \text{Vdata}(B) + Vth(T4) - \text{Vbody} \end{aligned}$$

Accordingly, the requirement for turning on the switching transistor T8 can be expressed as follows.

$$Vth(T8) > \text{Vdata}(B) + Vth(T4) - \text{Vbody} \tag{3}$$

Exemplary voltage settings are as follows:

$$Vdata(B)=5\text{ V}$$

$$ELVDD=4\text{ V}$$

$$ELVSS=-4\text{ V}$$

$$Voled=3\text{ V}$$

$$Vbody\approx\{(ELVDD-ELVSS)-Voled\}/2=2.5\text{ V}$$

$$Vini=-3\text{ V}$$

$$Vth(T4)=-4\text{ V}$$

$$Vth(T8)=-2\text{ V}$$

Here, the left-hand side of equation (3) is as follows:

$$Vth(T8)=-2\text{ V}$$

and the right-hand side of equation (3) is as follows:

$$Vdata(B)+Vth(T4)-Vbody=5\text{ V}+(-4\text{ V})-(2.5\text{ V})=-1.5\text{ V}$$

Thus, equation (3) is not satisfied. Accordingly, the switching transistor T8 is not turned on, with the result that the electrons trapped in the trap levels within the channel region of the drive transistor T4 are not discharged through the switching transistor T8 to the initialization line Vini and remain within the channel region of the drive transistor T4. Therefore, when the current frame provides the black display, an afterimage occurs (i.e., a bright black display portion appears) upon the gray display during the subsequent frame.

Figure 8:
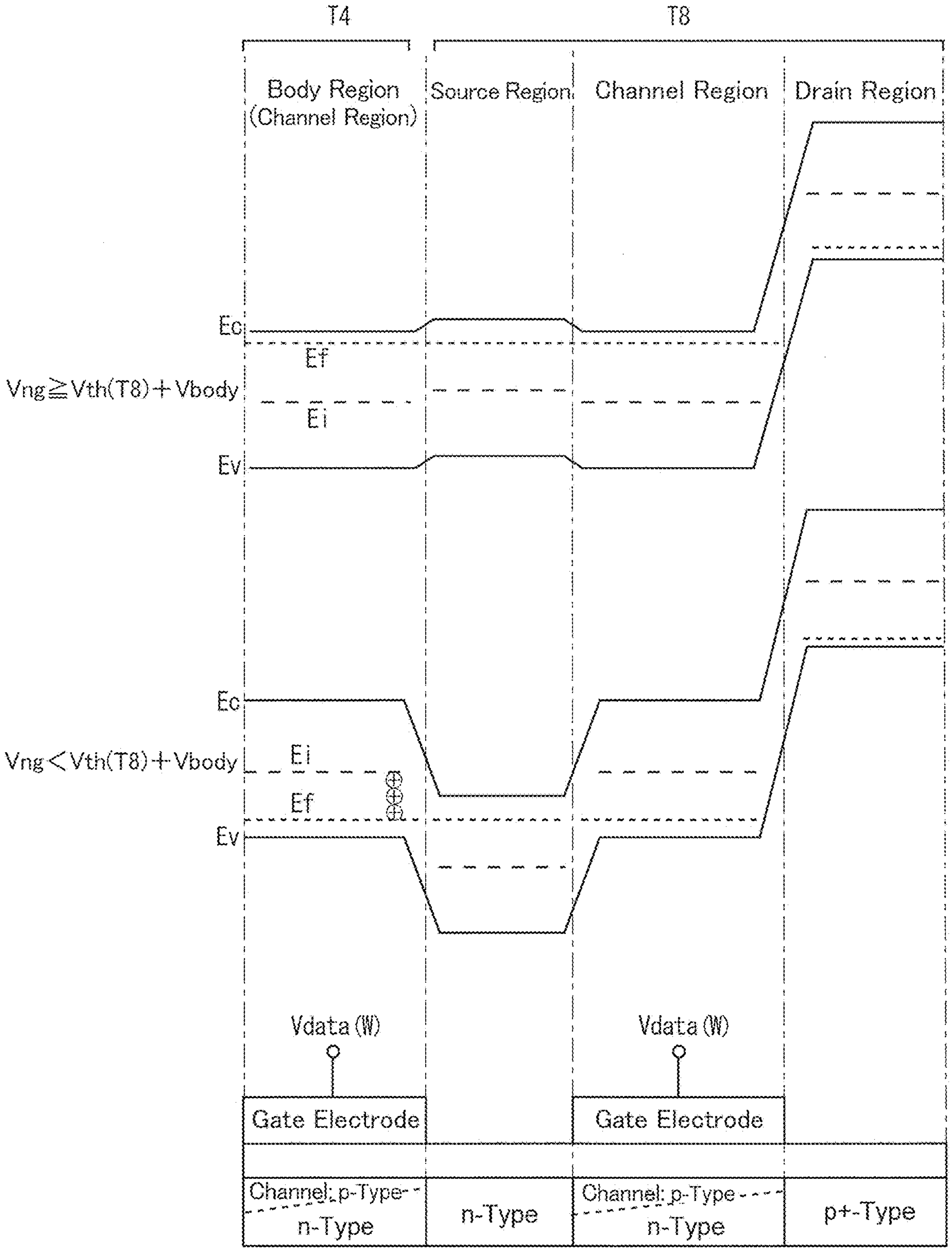
FIG. 8 is a diagram representing bands for a channel region of a drive transistor and a switching transistor with an n-type source region connected to the channel region.
Figure 9:
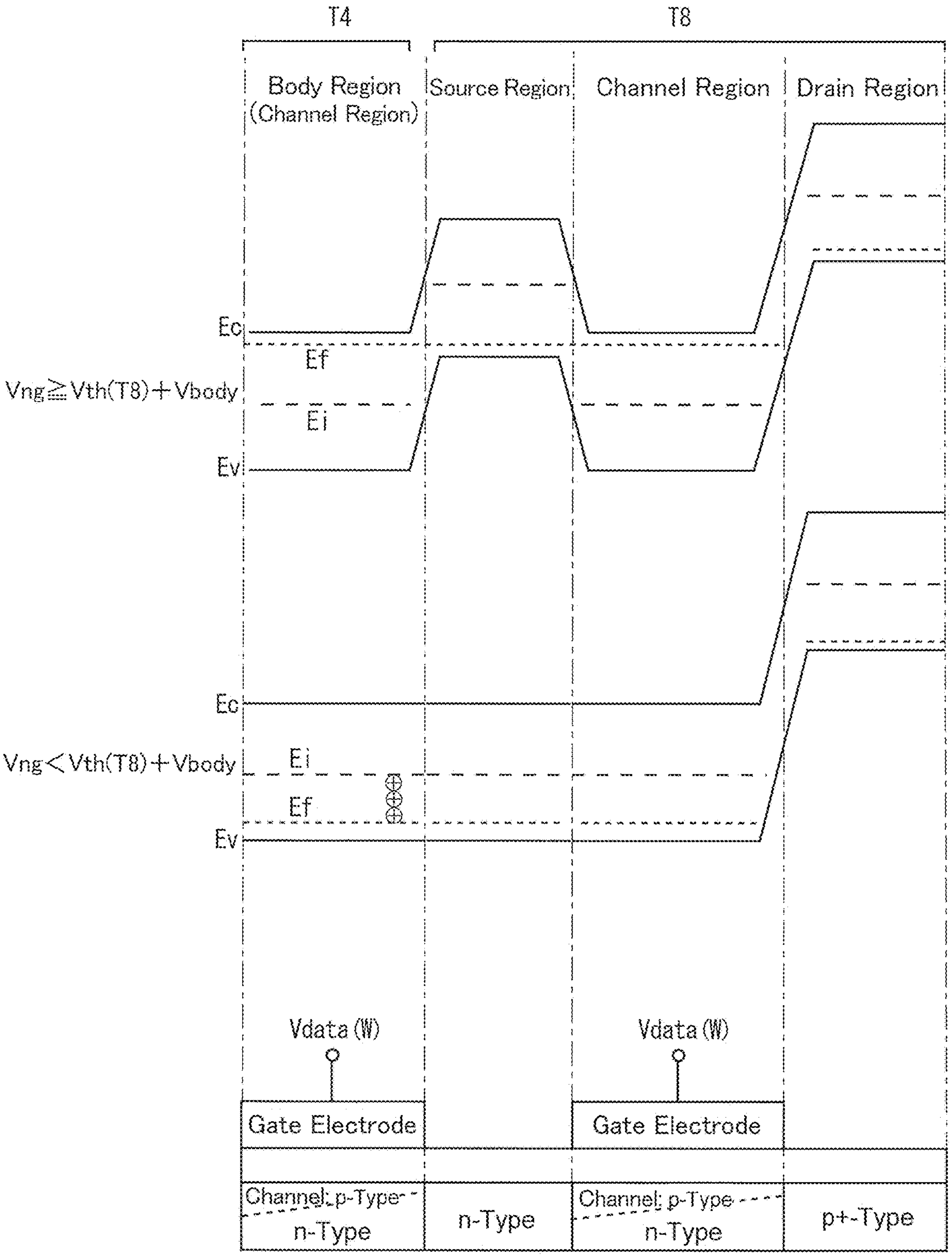
FIG. 9 is a diagram representing bands for the channel region of the drive transistor and a switching transistor with a p-type source region connected to the channel region.

2.6 Band Diagrams for Case Where Holes Trapped within Channel Region of Drive Transistor are Discharged to Initialization Line The following descriptions will be provided using band diagrams regarding cases where holes trapped within the channel region 42 are discharged through the switching transistor T8 to the initialization line Vini when the drive transistor T4 is turned on to allow a drive current flow. FIGS. 8 and 9 are diagrams representing bands for the channel region 42 of the drive transistor T4 and the switching transistor T8 connected to the channel region 42. FIG. 8 illustrates a case where the source region 81 of the T8 is of an n-type, and FIG. 9 illustrates a case where the source region 81 of the T8 is of a p-type.

Described first is a case where the drive transistor T4 and the switching transistor T8 are off. As shown in FIGS. 8 and 9, both the channel region 42 of the drive transistor T4 and the channel region 82 of the switching transistor T8 are n-type regions to which a voltage (Vng≥Vth(T8)+Vbody) to turn off the T8 is being applied. In this case, the Fermi level Ef of the channel region of the T4 is above an intrinsic Fermi level Ei, and therefore no holes are trapped within the channel region. The drain region 83, which is of a p+-type, is in contact with the n-type channel region 82 and connected to the initialization line Vini with a negative potential. Therefore, the Fermi level Ef of the drain region 83 is higher than that of the channel region by Vini, which is a reverse bias voltage. Since no holes are trapped within the channel region 42 at all, there is no hole discharge through the switching transistor T8 to the initialization line Vini, regardless of whether the source region 81 of the T8 is of the n-type or the p-type (i.e., in either case of FIG. 8 or 9).

Described next is a case where the drive transistor T4 and the switching transistor T8 are on.

The node N_G functions as the gate electrode for both the drive transistor T4 and the switching transistor T8, and therefore when a voltage (Vng<Vth(T8)+Vbody) to turn on the transistor T8 is applied to the gate electrode for the transistors T4 and T8, the Fermi levels Ef of the channel regions 42 and 82 become lower than the intrinsic Fermi level Ei, resulting in a conductive inversion from the n-type to the p-type. In response to this band bending (conductive inversion), holes are trapped in trap levels near the channel region 42 of the T4. When the source region 81 of the T8 is of the n-type, as shown in FIG. 8, this region serves as a potential barrier against holes, and therefore from the viewpoint of potential, fewer holes flow to Vini, but on the other hand, more holes become likely to be recombined with electrons, the majority carriers in the valence band of the source region 81, and therefore the holes trapped near the channel region of the T4 become more likely to disappear. Moreover, when the source region of the T8 is of the p-type, as shown in FIG. 9, this region does not serve as a potential barrier against holes, and therefore the holes trapped near the channel region of the T4 flow uninterruptedly and are then discharged to Vini.

2.7 Effects

In the present embodiment, when the L-level white display voltage is written to the node N_G as the data voltage to be subjected to threshold compensation regarding the drive transistor T4, holes are trapped in trap levels within the channel region 42 of the drive transistor T4. Then, when the data voltage for the white display is provided to the drive transistor T4 during the emission period, the drive transistor T4 supplies the organic EL element OLED with a drive current corresponding to the data voltage. At this time, the switching transistor T8 is turned on. Correspondingly, the holes trapped in the trap levels within the channel region 42 of the drive transistor T4 are discharged through the switching transistor T8 to the initialization line Vini. This leaves no holes trapped in the trap levels within the drive transistor T4, and therefore even when the gray display voltage is written during the subsequent frame, the drive transistor T4 supplies the organic EL element OLED with a current corresponding to the value of the written data voltage for the gray display through the emission control transistor T6. Thus, it is possible to display an image free of an afterimage.

3. Second Embodiment

3.1 Configuration of Organic EL Display Device

The overall configuration of an organic EL display device according to the second embodiment is the same as that of the organic EL display device according to the first embodiment shown in FIG. 2, and therefore any block diagram and descriptions thereof are omitted.

3.2 Configuration of Pixel Circuit

Figure 10:
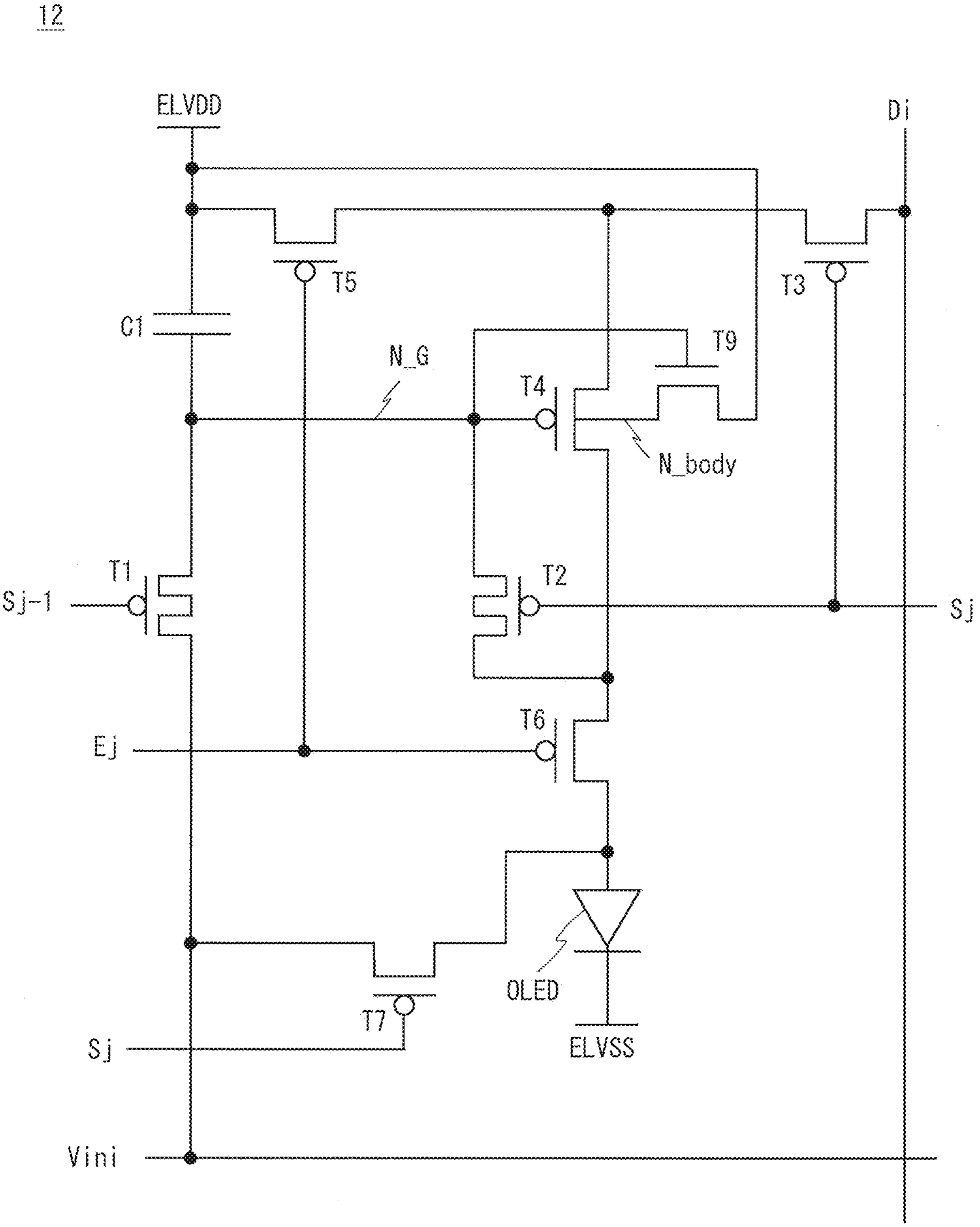
FIG. 10 is a circuit diagram illustrating the configuration of a pixel circuit included in an organic EL display device according to a second embodiment.

The configuration of the pixel circuit 12 formed in the display panel 10 in the present embodiment will now be described. FIG. 10 is a circuit diagram illustrating the configuration of the pixel circuit 12 included in the organic EL display device according to the present embodiment. The pixel circuit 12 shown in FIG. 10 differs from the pixel circuit 11 shown in FIG. 3 in that the switching transistor provided therein is an n-channel switching transistor T9 instead of the p-channel switching transistor T8. As with the switching transistor T8, the switching transistor T9 is connected at the source terminal to the channel region of the drive transistor T4 and at the gate terminal to the node NG. However, unlike the switching transistor T8, the switching transistor T9 is connected at the drain terminal to the H-level power supply line ELVDD with a positive potential. Other than the above, the pixel circuit 12 has the same configuration as that of the pixel circuit 11 shown in FIG. 3 and therefore will not be elaborated upon.

3.3 Layout Pattern of Switching Transistor and Its Surroundings

Figure 11:
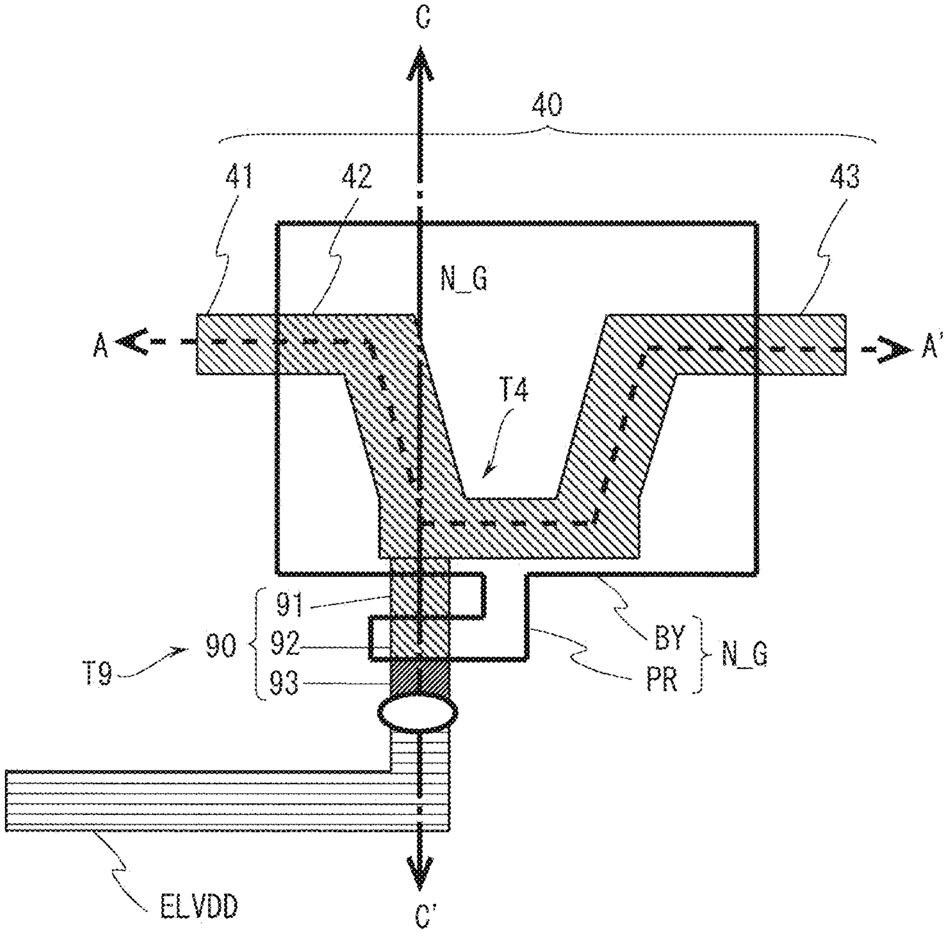
FIG. 11 is a plan view illustrating a layout pattern of a drive transistor, a switching transistor, and their surroundings within the pixel circuit shown in FIG. 10.

FIG. 11 is a plan view illustrating a layout pattern of the drive transistor T4, the switching transistor T9, and their surroundings within the pixel circuit 12. As shown in FIG. 11, the source region 41 and the drain region 43 of the semiconductor layer 40 (also referred to as the "first semiconductor layer") included in the drive transistor T4 are connected to the same elements as those described in the first embodiment and therefore will not be elaborated upon.

The switching transistor T9 includes a semiconductor layer 90 (also referred to as a "second semiconductor layer") extending downward from the channel region 42 of the drive transistor T4 in FIG. 11, and the semiconductor layer 90 consists of, from the closest end to the channel region 42 of the drive transistor T4, a source region 91 (also referred to as a "second source region"), a channel region 92 (also referred to as a "second channel region"), and a drain region 93 (also referred to as a "second drain region"). The source region 91 of the switching transistor T9 is connected to the channel region 42 of the drive transistor T4, and the drain region 93 is connected to the H-level power supply line ELVDD.

The node N_G functions as the gate electrode of the drive transistor T4 and also as a first terminal of a storage capacitor Cst for data voltage charging. The node N_G consists of a rectangular body portion BY covering the channel region 42 of the drive transistor T4 and a protruding portion PR branching out from the body portion BY as far as being located over the channel region 92 of the switching transistor T9. The body portion BY functions as a gate electrode for regulating a drive current flowing through the drive transistor T4 and also as the first terminal of the storage capacitor Cst for data voltage charging. The protruding portion PR functions as a gate electrode for regulating a current flowing through the switching transistor T9.

Figure 12:
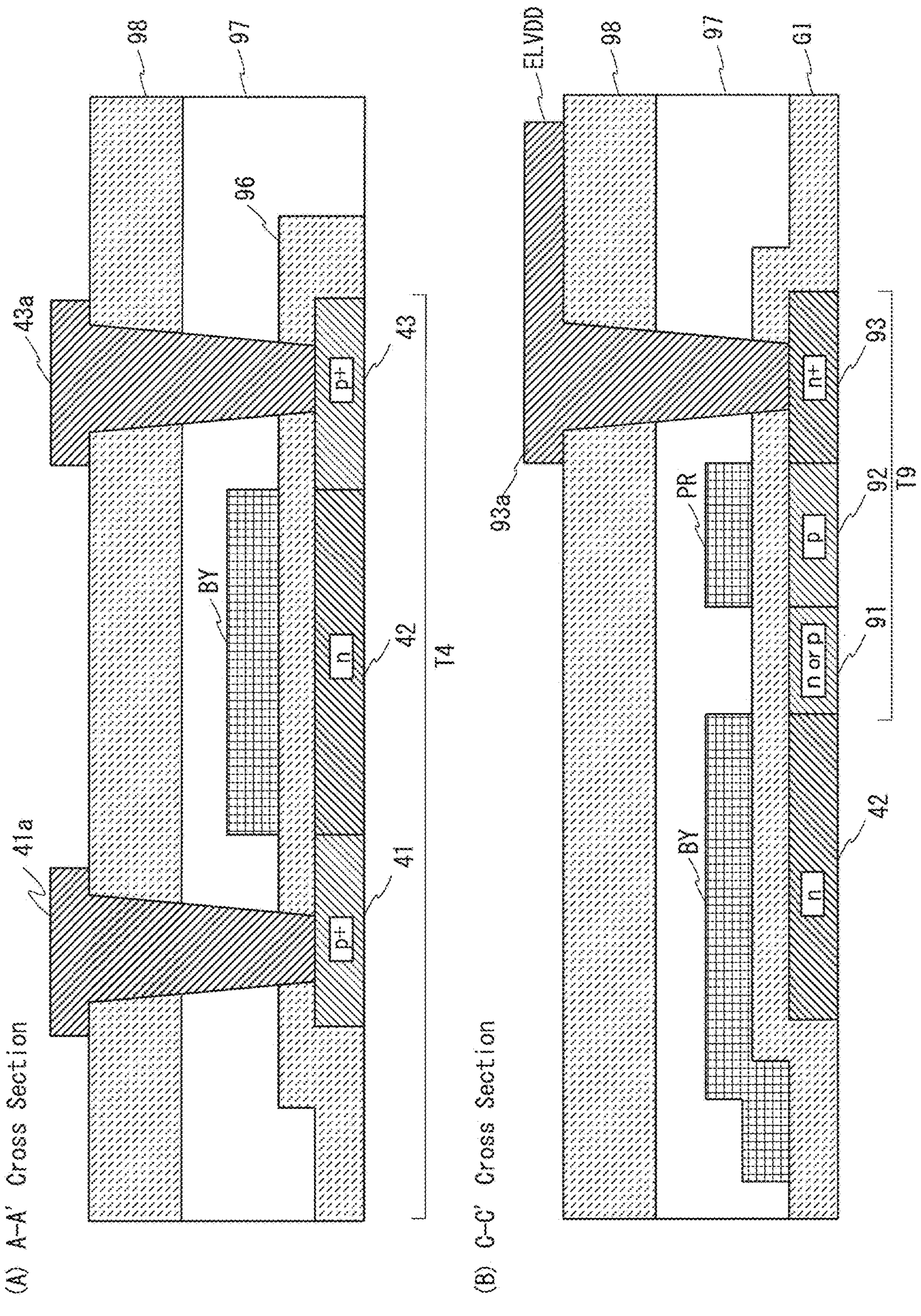
FIG. 12 provides cross-sectional views of the layout pattern shown in FIG. 11; more specifically, (A) of FIG. 12 is a cross-sectional view of the drive transistor taken along arrow line A-A' shown in FIG. 11, and (B) of FIG. 12 is a cross-sectional view of the switching transistor taken along arrow line C-C' shown in FIG. 11.

FIG. 12 provides cross-sectional views of the layout pattern shown in FIG. 11; more specifically, (A) of FIG. 12 is a cross-sectional view of the drive transistor T4 taken along arrow line A-A' shown in FIG. 11, and (B) of FIG. 12 is a cross-sectional view of the switching transistor T9 taken along arrow line C-C' shown in FIG. 11. Since the drive transistor T4 is of a p-channel type, the cross-sectional view shown in (A) of FIG. 12 is the same as that shown in (A) of FIG. 5. Therefore, the drive transistor T4 will not be elaborated upon.

The switching transistor T9, unlike the switching transistor T8, is an n-channel transistor, and the source region 91 and the drain region 93 are usually formed as n-type regions doped with n-type impurities, but the source region 91 may be a p-type (p+ or intrinsic) region, the channel region 92 may be a p-type region, and the drain region 93 may be an n+-type region, as shown in (B) of FIG. 12. The gate electrode, i.e., the protruding portion PR branching out from the body portion BY of the node N_G, is located above the channel region 92 of the switching transistor T9 with the gate insulation film GI sandwiched therebetween. The source region 91 is connected to the channel region 42 of the drive transistor T4, and the drain region 93 is connected to the H-level power supply line ELVDD.

3.4 Operation of Pixel Circuit

The operation of the pixel circuit is illustrated in the same timing charts as those for the first embodiment shown in FIGS. 6 and 7. Therefore, the operation of the pixel circuit 12 according to the present embodiment will be described with reference to FIGS. 6 and 7.

3.4.1 Case Where Data Voltage Changes from Either M or L Level to H Level or Remains at H Level Described below is a case where the data voltage changes from either the M or L level to the H level, i.e., the black display voltage, or remains at the H level, as shown in FIG. 7. The operation up until time t1 is the same as in the first embodiment and therefore will not be elaborated upon. At time t2, the data voltage being applied to the data line Di changes from either the M or L level to the H level, or remains at the H level. Thereafter, during the period up until time t3, the scanning line Sj undergoes an H to L level potential change. Correspondingly, the write transistor T3 and the compensation transistor T2 are turned on, with the result that the H-level data voltage is written to the node N_G and undergoes threshold compensation regarding the drive transistor T4. Subsequently, the potential on the scanning line Sj returns from L to H level, with the result that the write transistor T3 and the compensation transistor T2 are turned off, and the node N_G has a potential as expressed by the same equation as equation (1) in the first embodiment.

$$Vng = Vdata - |Vth|$$

Here, once the black display voltage is applied to the gate electrode of the drive transistor T4, electrons are cumulatively trapped in trap levels within the channel region 42. The trapped electrons cause an afterimage perceptible to the viewer during the subsequent frame. However, in the present embodiment, the transistor T9 is turned on at the instant when the data voltage being written to the node N_G transitions to the H level, with the result that electrons trapped at grain boundaries and the interface between the channel region 42 and the gate insulation film are released through the transistor T9 to the H-level power supply line ELVDD. Consequently, the occurrence of an afterimage phenomenon due to the trapped electrons can be inhibited during the subsequent frame.

At time t3, the emission line Ej undergoes an H to L level potential change. Correspondingly, the emission control transistor T6 and the power supply transistor T5 are turned on, with the result that the organic EL element OLED is supplied with a current flowing from the H-level power supply line ELVDD through the power supply transistor T5, the drive transistor T4, and the emission control transistor T6 in this order. In this case, as the current flows through the power supply transistor T5 to the drive transistor T4, the drive transistor T4 supplies the current to the organic EL element OLED while regulating the current with the black display voltage Vdata (B) written in the node N_G. Consequently, the organic EL element OLED emits light, and the pixel circuit 11 presents a black display image. Thereafter, up until time t7, the current continues to flow to the organic EL element OLED, and the pixel circuit 11 continues to present the black display image.

The subsequent frame starts at time t7. At time t7, the potential on the emission line Ej changes from L to H level. Correspondingly, the emission control transistor T6 and the power supply transistor T5 are turned off, resulting in no current supply to the organic EL element OLED, and the organic EL element OLED stops emitting light. Thereafter, during the period up until time t8, the preceding scanning line Sj−1 undergoes an H to L level potential change, with the result that the first initialization transistor T1 is turned on. Consequently, the potential Vng at the node NG is initialized to the initialization potential Vini. Moreover, the potential on the preceding scanning line Sj−1 returns from L to H level, with the result that the first initialization transistor T1 is turned off. Consequently, the node N_G holds the initialization potential Vini.

At time t8, the data voltage being applied to the data line Di changes from the H to the M level. Thereafter, during the period up until time t9, the potential on the scanning line Sj changes from H to L level. Correspondingly, the write transistor T3 and the compensation transistor T2 are turned on, with the result that the M-level data voltage is written to the node N_G and undergoes threshold compensation regarding the drive transistor T4.

In the case of the known pixel circuit 15 shown in FIG. 1, electrons are trapped in trap levels within the channel region 42 during the period from time t2 to time t3 within the current frame. The known pixel circuit 15 includes no mechanism provided to actively release the trapped electrons, and therefore from time t2 onward, the trapped electrons are less likely to be released, leaving some electrons unreleased even during the subsequent frame (because the release occurs slowly in accordance with a time constant of the order of milliseconds or more). Accordingly, from time t8 onward, more carriers (i.e., more current) are induced within the channel region 42 than those corresponding to the M-level data voltage written in the node N_G. Consequently, the viewer perceives an image with an increased luminance (i.e., an afterimage).

On the other hand, in the case of the pixel circuit 12 according to the present embodiment shown in FIG. 10, the switching transistor T9 remains on from time t2 to time t7, with the result that the electrons trapped in the trap levels within the channel region 42 are discharged through the switching transistor T9 to the H-level power supply line ELVDD. At time t8 within the subsequent frame, carriers (current) are induced within the channel region 42 in accordance with the M-level data voltage written in the node N_G. Accordingly, the occurrence of an afterimage due to the trapped electrons can be inhibited. Subsequently, during the period up until time t9, the potential on the scanning line Sj returns from L to H level, with the result that the write transistor T3 and the compensation transistor T2 are turned off.

At time t9, the potential on the emission line Ej changes from H to L level. Correspondingly, the power supply transistor T5 and the emission control transistor T6 are turned on, and the organic EL element OLED is supplied with a current flowing from the H-level power supply line ELVDD through the power supply transistor T5, the drive transistor T4, and the emission control transistor T6 in this order. In this case, as the current flows from the H-level power supply line ELVDD through the power supply transistor T5 to the drive transistor T4, the drive transistor T4 regulates the current with the data voltage for the gray display written in the node N_G.

As described above, in the case of the pixel circuit 12, when the data voltage changes from either the M or L level to the H level, or remains at the H level, at time t2, the switching transistor T9 remains on during the period from time t2 to time t7 within the current frame. Correspondingly, the electrons trapped in the trap levels within the channel region 42 are discharged through the switching transistor T9 to the H-level power supply line ELVDD. Accordingly, from time t8 onward, carriers (current) are induced within the channel region 42 in accordance with the desired M-level data voltage. In this manner, any afterimage phenomenon is inhibited, with the result that the organic EL element OLED emits light with a luminance corresponding to the data voltage, and the pixel circuit 12 presents a desired gray display image. Thereafter, the desired current continues to flow to the organic EL element OLED, with the result that the organic EL element OLED continues to emit light with the desired luminance corresponding to the data voltage, and the pixel circuit 12 provides the gray display.

3.4.2 Case Where Data Voltage Changes from Either H or M Level to L Level or Remains at L Level As shown in FIG. 6, at time t2, the data voltage being applied to the data line Di changes from either the H or M level to the L level or remains at the L level. Thereafter, during the period up until time t3, the scanning line Sj undergoes an H to L level potential change. Correspondingly, the transistor write T3 and the compensation transistor T2 are turned on, with the result that the L-level data voltage is written to the node N_G and undergoes threshold compensation regarding the drive transistor T4. Subsequently, the potential on the scanning line Sj returns from L to H level, with the result that the write transistor T3 and the compensation transistor T2 are turned off.

The emission period within the current frame starts at time t3, and the emission line Ej undergoes an H to L level potential change. Correspondingly, the power supply transistor T5 and the emission control transistor T6 are turned on, with the result that the organic EL element OLED is supplied with a current flowing from the H-level power supply line ELVDD through the power supply transistor T5, the drive transistor T4, and the emission control transistor T6 in this order. In this case, as the current flows from the H-level power supply line ELVDD through the power supply transistor T5 to the drive transistor T4, the drive transistor T4 regulates the current with the data voltage for the white display written to the node N_G. Consequently, the organic EL element OLED emits light with a luminance corresponding to the data voltage, and the pixel circuit provides the white display.

Here, once the white display voltage is applied to the gate electrode of the drive transistor T4, the data voltage being written to the node N_G transitions to the L level, with the result that the switching transistor T9 is turned off. Correspondingly, the channel region 42 of the drive transistor T4 is disconnected from the H-level power supply line ELVDD.

Note that the white display voltage causes fewer electrons to be trapped in trap levels within the channel region 42, and therefore even if the trapped electrons are not discharged to the H-level power supply line ELVDD, the electrons left trapped lead to almost no perceptible afterimage, but on the other hand, holes are more significantly trapped in trap levels, resulting in a perceptible afterimage (luminance increase).

The subsequent frame starts at time t7. At time t7, the potential on the emission line Ej changes from L to H level. Correspondingly, the emission control transistor T6 and the power supply transistor T5 are tuned off, resulting in no current supply to the organic EL element OLED, and therefore the organic EL element OLED stops emitting light. Thereafter, during the period up until time t8, the preceding scanning line Sj–1 undergoes an H to L level potential change, with the result that the first initialization transistor T1 is turned on. Consequently, the potential Vng at the node N_G is initialized to the initialization potential Vini. Moreover, the potential on the preceding scanning line Sj–1 returns from L to H level, with the result the first initialization transistor T1 is turned off. Consequently, the node N_G holds the initialization potential Vini.

At time t8, the data voltage being applied to the data line Di changes from the L to the M level. Thereafter, during the period up until time t9, the potential on the scanning line Sj changes from H to L level. Consequently, the write transistor T3 and the compensation transistor T2 are turned on, with the result that the M-level data voltage is written to the node N_G and undergoes threshold compensation regarding the drive transistor T4.

In the case of the known pixel circuit 15 shown in FIG. 1, holes are trapped in trap levels within the channel region 42 during the period from time t2 to time t3 within the current frame. The known pixel circuit 15 includes no mechanism provided to actively release the trapped holes, and therefore the trapped holes are less likely to be released from time t2 onward, leaving some holes unreleased (because the release of the trapped holes occurs slowly in accordance with a time constant of the order of milliseconds or more). Accordingly, from time t8 onward within the subsequent frame, fewer carriers (i.e., less current) are induced within the channel region 42 than those corresponding to the M-level data voltage written in the node N_G. Consequently, the viewer perceives an image with a reduced luminance (i.e., an afterimage).

On the other hand, in the case of the pixel circuit 12 according to the present embodiment shown in FIG. 10, the switching transistor T9 remains on from time t2 to time t7, but the power supply line connected thereto is the H-level power supply line ELVDD with a positive potential, and therefore the holes trapped in the trap levels within the channel region 42 are left undischarged. Accordingly, from time t8 onward within the subsequent frame, fewer carriers (i.e., less current) are induced within the channel region 42 than those corresponding to the M-level data voltage written in the node N_G. Consequently, as in the case of the known pixel circuit 15, the viewer perceives an image with a reduced luminance (i.e., an afterimage). Subsequently, during the period up until time t9, the potential on the scanning line Sj returns from L to H level, with the result that the write transistor T3 and the compensation transistor T2 are turned off.

At time t9, the potential on the emission line Ej changes from H to L level. Correspondingly, the power supply transistor T5 and the emission control transistor T6 are turned on, and the organic EL element OLED is supplied with a current flowing from the H-level power supply line ELVDD through the power supply transistor T5, the drive transistor T4, and the emission control transistor T6 in this order. In this case, as the current flows from the H-level power supply line ELVDD through the power supply transistor T5 to the drive transistor T4, the drive transistor T4 regulates the current with the data voltage for the gray display written in the node N_G.

As described above, in the case of the pixel circuit 12, when the data voltage changes from either the H or M level to the L level, or remains at the L level, at time t2, the switching transistor T9 remains on during the period from time t2 to time t7 within the current frame, but the power supply line connected thereto is the positive-potential H-level power supply line ELVDD, and therefore the holes trapped in the trap levels within the channel region 42 are left undischarged. Accordingly, from time t8 onward within the subsequent frame, fewer carriers (i.e., less current) are induced within the channel region 42 than those corresponding to the desired M-level data voltage. This does not inhibit any afterimage phenomenon, with the result that at the instant of switching to the gray display, the organic EL element OLED emits light with a luminance lower than that corresponding to the data voltage, and therefore the pixel circuit 12 displays a darker image than the desired gray display. Thereafter, the trapped holes are released gradually (and slowly in accordance with a time constant), and therefore the luminance of the organic EL element OLED decreases little by little to a desired value corresponding to the desired M-level data voltage in several tens of seconds, t ultimately providing the desired gray display free of an afterimage.

3.5 Operation of Switching Transistor

3.5.1 Case Where H-Level Black Display Voltage Is Written to Node N_G

When the threshold voltage of the drive transistor T4 is compensated for by writing the H-level black display voltage Vdata (B) to the node N_G during the current frame, electrons are trapped in trap levels within the channel region of the drive transistor T4. Therefore, to discharge the trapped electrons through the n-channel switching transistor T9 to the H-level power supply line ELLVDD, the switching transistor T9 needs to be turned on. The requirement for turning on the n-channel switching transistor T9 is as follows.

$$Vth(T9)<Vgs$$

Here, Vgs is a gate-source voltage of the switching transistor T9 as expressed by the following equation.

$$Vgs=Vng-Vbody=Vdata\,(B)+Vth\,(T4)-Vbody$$

Accordingly, the requirement for turning on the switching transistor T9 can be expressed as follows.

$$Vth\,(T9)<Vdata\,(B)+Vth\,(T4)-Vbody \tag{4}$$

To turn on the switching transistor T9, the threshold voltage Vth (T4) of the drive transistor T4, the threshold voltage Vth (T9) of the switching transistor T9, and the black display voltage Vdata (B) are set to satisfy equation (4) above. Exemplary voltage settings are as follows:

$$Vdata(B) = 5\text{ V}$$

$$ELVDD = 4\text{ V}$$

$$ELVSS = -4\text{ V}$$

$$Voled = 3\text{ V}$$

$$Vbody \approx \{(ELVDD - ELVSS) - Voled\}/2 = 2.5\text{ V}$$

$$Vini = -3\text{ V}$$

$$Vth(T4) = -4\text{ V}$$

$$Vth(T9) = -2\text{ V}$$

Here, the left-hand side of equation (4) is expressed as:

$$Vth(T9) = -2\text{ V}$$

and the right-hand side of equation (4) is expressed as:

$$Vdata(B) + Vth(T4) - Vbody = 5\text{ V} + (-4\text{ V}) - (2.5\text{ V}) = -1.5\text{ V}$$

Thus, equation (4) is satisfied. Accordingly, the switching transistor T9 is turned on, with the result that the electrons trapped in the trap levels within the channel region of the drive transistor T4 are discharged through the switching transistor T9 to the H-level power supply line ELLVDD. Consequently, when the current frame provides the black display, no afterimage appears as a bright black display portion in a gray display area during the subsequent frame. However, it should be noted that in the above exemplary voltage settings, the threshold voltage Vth (T9) of the switching transistor T9, which is an n-channel transistor of a depletion type, is set at −2V. When the threshold voltages and the power supply voltage are not set to satisfy equation (4), the switching transistor T9 is not turned on, with the result that an afterimage might occur even when the current frame provides the black display.

3.5.2 Case Where L-Level White Display Voltage Is Written to Node N_G

When the L-level white display voltage is written during the current frame, holes are trapped in trap levels within the channel region of the drive transistor T4. In this case, the requirement for turning on the n-channel switching transistor T9 can be expressed by the following equation.

$$Vth(T9) < Vgs$$

In this case, $$Vgs = Vng - Vbody = Vdata(W) + Vth(T4) - Vbody$$

Accordingly, the requirement for turning on the switching transistor T9 can be expressed by equation (5) below, similar to equation (4).

$$Vth(T9) < Vdata(W) + Vth(T4) - Vbody \quad (5)$$

Exemplary voltage settings are as follows:

$$Vdata(W) = 2\text{ V}$$

$$ELVDD = 4\text{ V}$$

$$ELVSS = -4\text{ V}$$

$$Voled = 3\text{ V}$$

$$Vbody \approx \{(ELVDD - ELVSS) - Voled\}/2 = 2.5\text{ V}$$

$$Vini = -3\text{ V}$$

$$Vth(T4) = -4\text{ V}$$

$$Vth(T9) = -2\text{ V}$$

Here, the left-hand side of equation (5) is expressed as:

$$Vth(T9) = -2\text{ V}$$

and the right-hand side of equation (5) is expressed as:

$$Vdata(W) + Vth(T4) - Vbody = 2\text{ V} + (-4\text{ V}) - (2.5\text{ V}) = -4.5\text{ V}$$

Thus, equation (5) is not satisfied. Accordingly, the switching transistor T9 is not turned on, with the result that the holes trapped in the trap levels within the channel region of the drive transistor T4 are not discharged to the H-level power supply line ELVDD and remain within the channel region of the drive transistor T4. Therefore, when the current frame provides the white display, an afterimage occurs (i.e., a dark white display portion appears) upon the gray display during the subsequent frame. However, it should be noted that in the above exemplary voltage settings, the threshold voltage Vth (T9) of the switching transistor T9, which is an n-channel transistor of a depletion type, is set at −2V.

3.6 Effects

In the present embodiment, when the H-level black display voltage is written to the node N_G to be subjected to threshold compensation regarding the drive transistor T4, electrons are trapped in trap levels within the channel region of the drive transistor T4. When the drive transistor T4 is turned on, the organic EL element OLED is supplied with a drive current, releasing the trapped electrons from the trap levels within the channel region of the drive transistor T4. The released electrons are discharged through the switching transistor T9 to the H-level power supply line ELVDD. This leaves no electrons trapped in the trap levels within the drive transistor T4, and therefore even when the gray display voltage is written during the subsequent frame, the drive transistor T4 supplies the organic EL element OLED with a current corresponding to the value of the written data voltage for the gray display through the emission control transistor T6. Thus, it is possible to display an image free of an afterimage during the subsequent frame.

4. Third Embodiment

The overall configuration of an organic EL display device according to the third embodiment is the same as that of the organic EL display device according to the first embodiment shown in FIG. 2, and therefore any block diagram and descriptions thereof are omitted.

4.1 Configuration of Pixel Circuit

Figure 13:
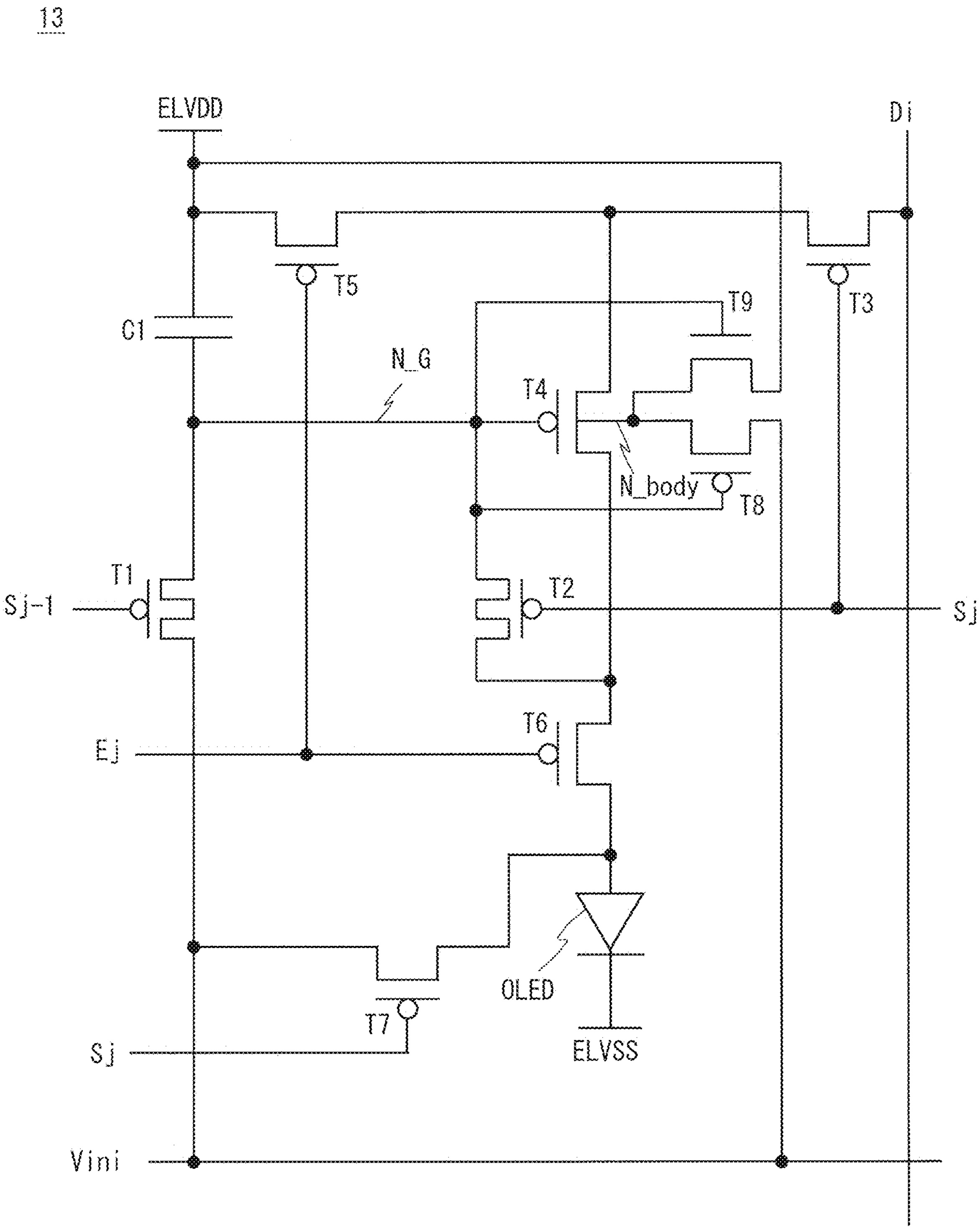
FIG. 13 is a circuit diagram illustrating the configuration of a pixel circuit included in an organic EL display device according to a third embodiment.

The configuration of the pixel circuit 13 formed in the display panel 10 in the present embodiment will now be described. FIG. 13 is a circuit diagram illustrating the configuration of the pixel circuit 13 included in the organic EL display device according to the present embodiment. As shown in FIG. 13, the pixel circuit 13 includes the p-channel switching transistor T8 described in the first embodiment and the n-channel switching transistor T9 described in the second embodiment. Both the switching transistor T8 and the switching transistor T9 are connected at their respective source terminals to the body terminal N_body of the drive transistor T4. The switching transistor T8 is connected at the drain terminal to the initialization line Vini, and the switching transistor T9 is connected at the drain terminal to the H-level power supply line ELVDD. Moreover, both the switching transistors T8 and T9 are connected at their respective gate terminals to the node N_G. Other than the above, the pixel circuit 13 has the same configuration as that of the pixel circuit 11 shown in FIG. 3 and therefore will not be elaborated upon.

4.2 Layout Pattern of Switching Transistors and their Surroundings

Figure 14:
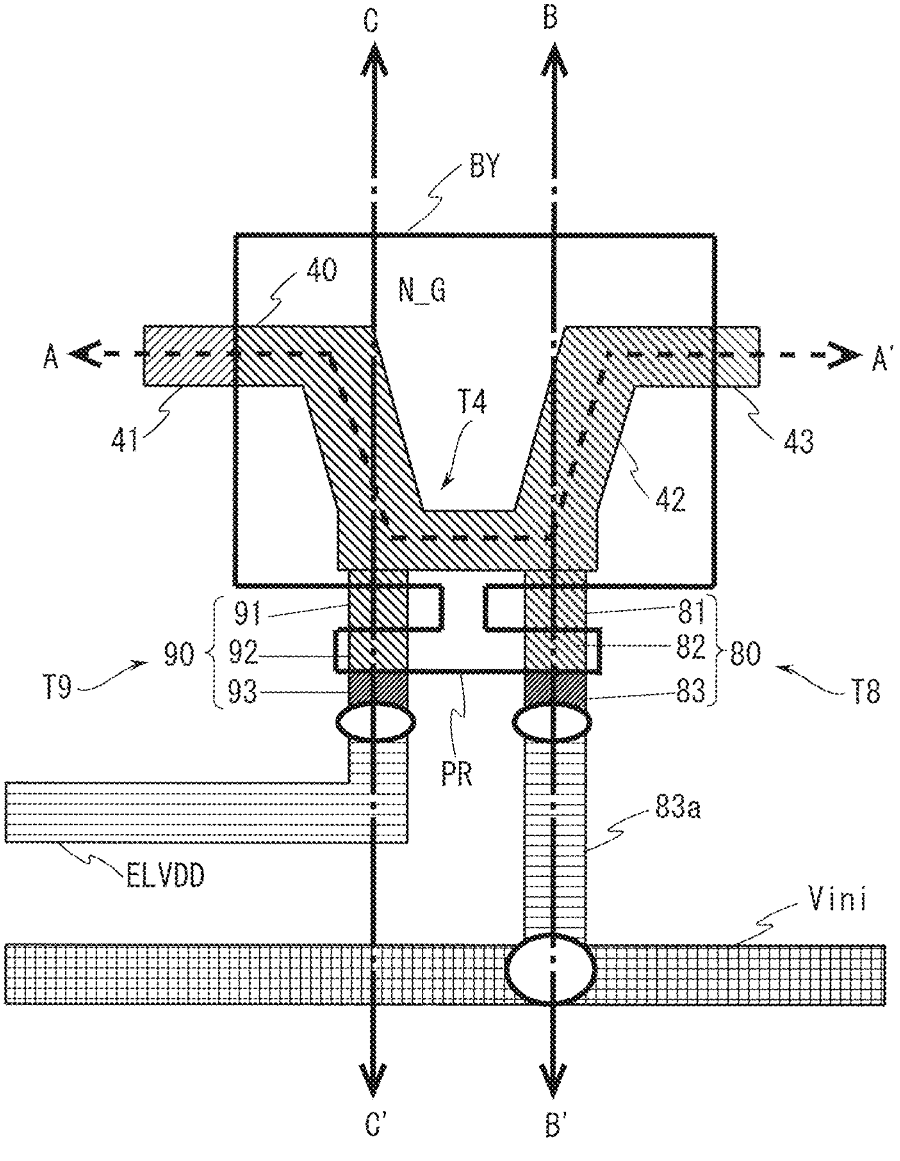
FIG. 14 is a plan view illustrating a layout pattern of a drive transistor, switching transistors, and their surroundings within the pixel circuit shown in FIG. 13.

FIG. 14 is a plan view illustrating a layout pattern of the drive transistor T4, the switching transistor T8, the switching transistor T9, and their surroundings. The semiconductor layer 40 (also referred to as the "first semiconductor layer") included in the drive transistor T4 is the same as in the first and second embodiments and therefore will not be elaborated upon. The two semiconductor layers 80 and 90 (also collectively referred to as the "second semiconductor layers") are formed extending downward from the channel region 42 of the drive transistor T4.

The switching transistor T8 has the same configuration as the p-channel switching transistor T8 described in the first embodiment, and the switching transistor T9 has the same configuration as the n-channel switching transistor T9 described in the second embodiment. Therefore, the components of the switching transistors T8 and T9 are denoted by the same reference characters as those in FIGS. 4 and 11 and will not be elaborated upon.

The node N_G consists of a rectangular body portion BY covering the channel region of the drive transistor T4 and a protruding portion PR extending from the body portion BY as far as being located over the channel regions 82 and 92 of the switching transistors T8 and T9. The protruding portion PR branches into two ends, one extending over the channel region 82 of the switching transistor T8, and the other extending over the channel region 92 of the switching transistor T9. These function as gate electrodes for use in on/off control of the switching transistors T8 and T9, respectively, to discharge holes or electrons trapped within the channel region of the drive transistor T4.

Figure 15:
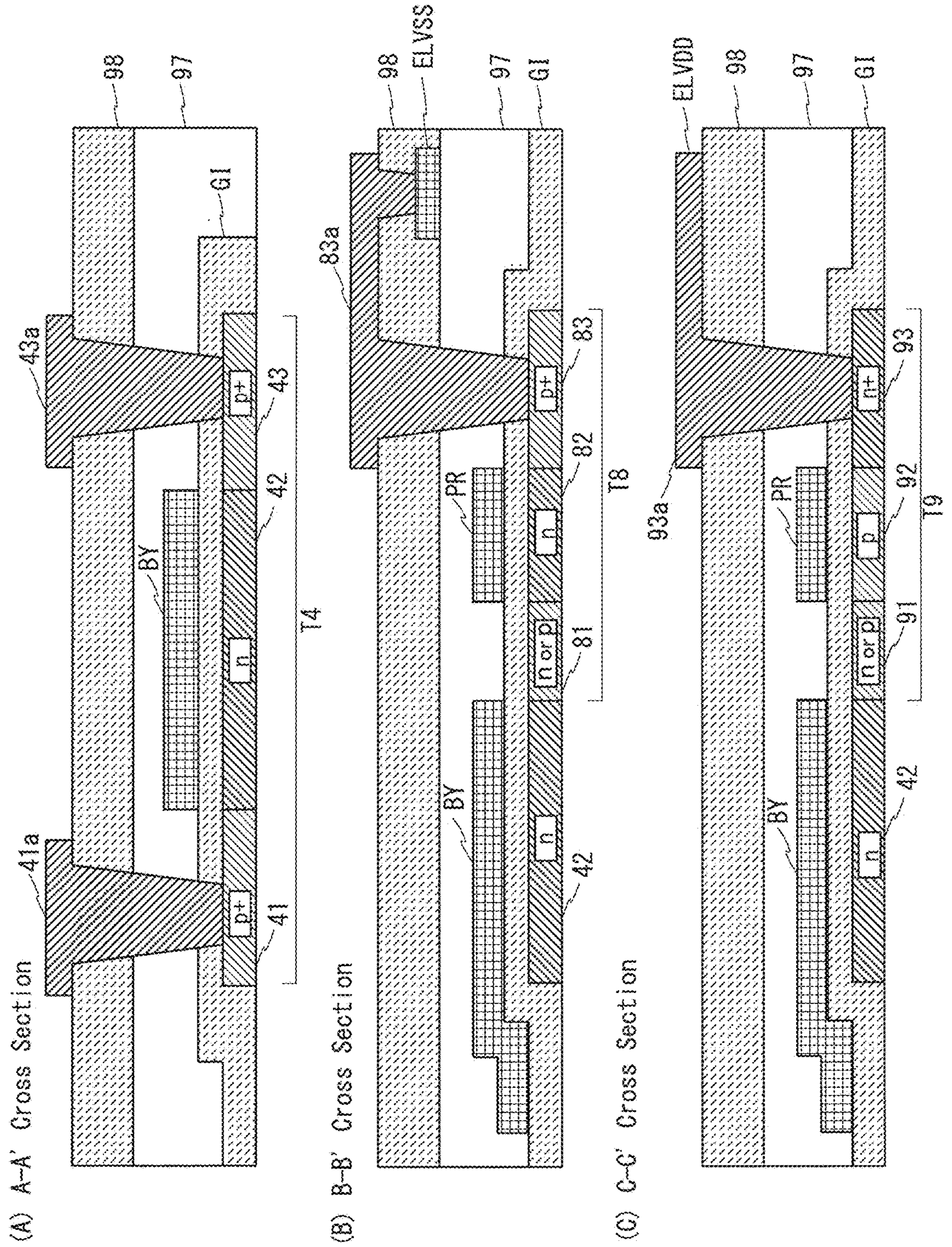
FIG. 15 provides cross-sectional views of the layout pattern shown in FIG. 14; more specifically, (A) of FIG. 15 is a cross-sectional view of the drive transistor T4 taken along arrow line A-A' shown in FIG. 14, (B) of FIG. 15 is a cross-sectional view of one switching transistor taken along arrow line B-B' shown in FIG. 14, and (C) of FIG. 15 is a cross-sectional view of the other switching transistor taken along arrow line C-C' shown in FIG. 14.

FIG. 15 provides cross-sectional views of the layout pattern shown in FIG. 14; more specifically, (A) of FIG. 15 is a cross-sectional view of the drive transistor T4 taken along arrow line A-A' shown in FIG. 14, (B) of FIG. 15 is a cross-sectional view of the switching transistor T8 taken along arrow line B-B' shown in FIG. 14, and (C) of FIG. 15 is a cross-sectional view of the switching transistor T9 taken along arrow line C-C' shown in FIG. 14. The cross-sectional view in (A) of FIG. 15 shows the same structure as that shown in the cross-sectional of the drive transistor T4 in (A) of FIG. 5. Moreover, the cross-sectional view in (B) of FIG. 15 shows the same structure as that shown in the cross-sectional view of the switching transistor T8 in (B) of FIG. 5, and the cross-sectional view in (C) of FIG. 15 shows the same structure as that shown in the cross-sectional view of the switching transistor T9 in (B) of FIG. 12. Therefore, the structures of these transistors T4, T8, and T9 will not be elaborated upon.

4.3 Operation of Pixel Circuit

The operation of the pixel circuit 13 is illustrated in the same timing charts as those shown in FIGS. 6 and 7 and described in the first and second embodiments. Accordingly, details of the operation of the switching transistors T8 and T9 in the present embodiment are the same as those described in the first and second embodiments and will not be elaborated upon.

4.4 Effects

In the present embodiment, when the L-level white display voltage is written to the node N_G as the data voltage to be subjected to threshold compensation regarding the drive transistor T4, holes are trapped in trap levels within the channel region 42 of the drive transistor T4, and simultaneously the switching transistor T8 is turned on. Similarly, when the H-level black display voltage is written to the node N_G as the data voltage, electrons are trapped in trap levels within the channel region 42 of the drive transistor T4, and simultaneously the switching transistor T9 is turned on.

In this manner, either the switching transistor T8 or T9 is turned on depending on the data voltage (the H or L level) corresponding to the white or black display. Therefore, in the case of the white display, the carriers that are trapped in the trap levels within the channel region 42 of the drive transistor T4 are holes and discharged through the switching transistor T8 to the initialization line Vini, while in the case of the black display, the trapped carriers are electrons and discharged through the switching transistor T9 to the H-level power supply line ELVDD. Consequently, neither holes nor electrons are left trapped in the trap levels within the drive transistor T4, and therefore even when the gray display voltage is written during the subsequent frame, the organic EL element OLED is supplied with a current corresponding to the value of the written data voltage for the gray display. Thus, the subsequent frame is not affected by the carriers trapped in the trap levels within the channel region 42 of the drive transistor T4 during the current frame, and therefore when an image is displayed at the M level, the image can be displayed without any afterimage, with a luminance corresponding to the data voltage.

5. Fourth Embodiment (Variant of First Embodiment)

In the first through third embodiments, both the switching transistors T8 and T9 are connected at their respective gate terminals to the node N_G, which includes the gate terminal of the drive transistor T4, but the switching transistor T8, which is of the p-channel type, is in ON state when the node N_G is being provided with at least the lower of the data voltages that respectively indicate the maximum and minimum display luminances (i.e., the white and black display voltages), whereas switching transistor T9, which is of the n-channel type, is in ON state when the node N_G is being provided with at least the higher of the data voltages that respectively indicate the maximum and minimum display luminances (i.e., the white and black display voltages). Described below is a fourth embodiment as another example of the thus-configured organic EL display device, where the p-channel switching transistor T8 is in ON state when the node N_G is being provided with at least the lower of the data voltages that respectively indicate the maximum and minimum display luminances.

Figure 16:
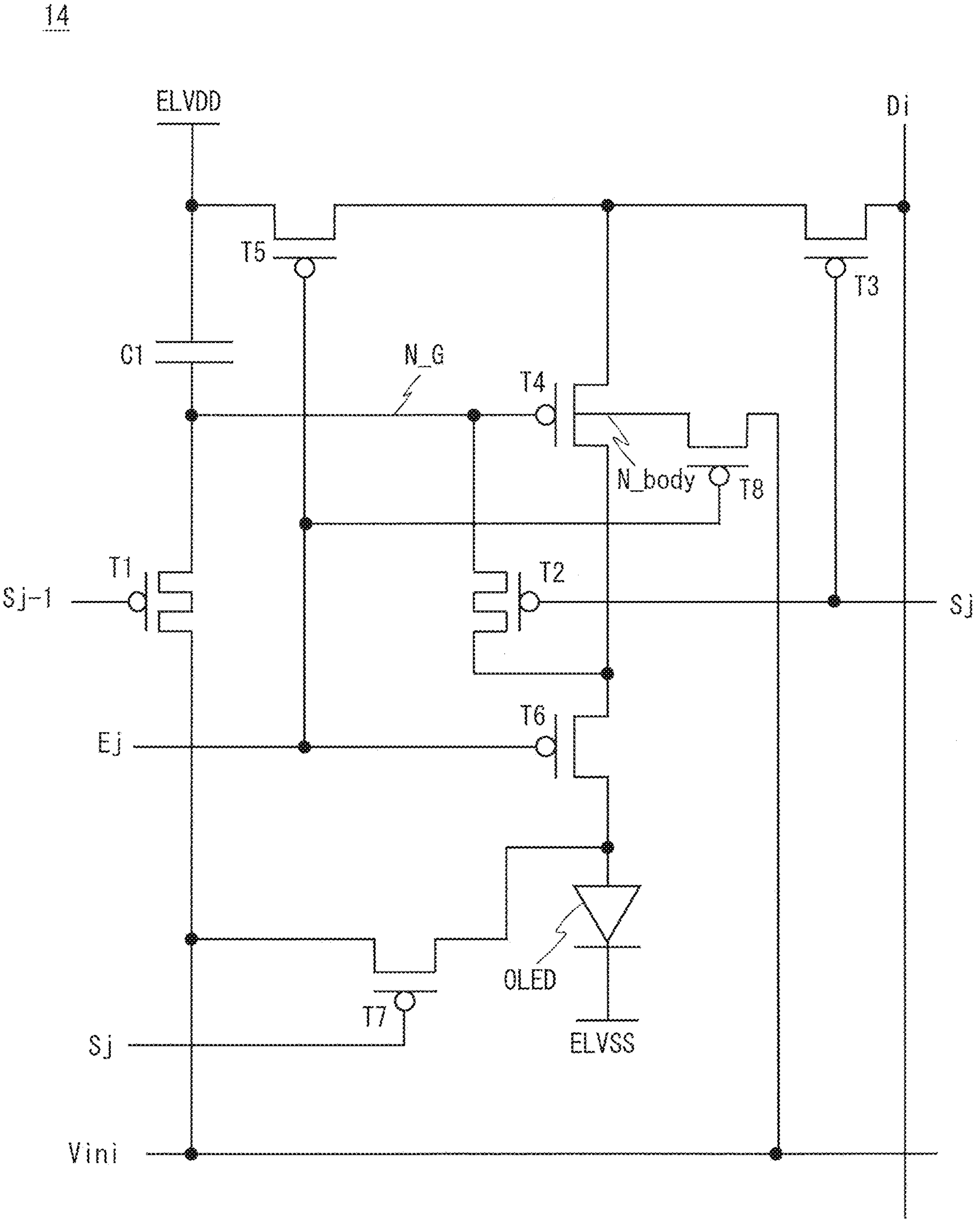
FIG. 16 is a circuit diagram illustrating the configuration of a pixel circuit included in an organic EL display device according to a fourth embodiment.

The present embodiment is a variant of the first embodiment and differs from the first embodiment only in the configuration of the pixel circuit. FIG. 16 is a circuit diagram illustrating the configuration of the pixel circuit 14 in the present embodiment. As shown in FIG. 16, in the pixel circuit 14 in the present embodiment, the p-channel switching transistor T8 is connected at the gate terminal to the corresponding emission line Ej, and in this regard, the pixel circuit 14 differs from the pixel circuit 11 in the first embodiment (FIG. 3), where the transistor T8 is connected at the gate terminal to the gate terminal of the drive transistor T4 (i.e., the node N_G). Other than the above, the pixel circuit 14 in the present embodiment has the same configuration as that of the pixel circuit 11 in the first embodiment.

In the case of the pixel circuit 14 in the present embodiment as described above, during the emission period, as shown in FIG. 6, the gate terminal of the drive transistor T4 (i.e., the node N_G) is provided with a data voltage written to the storage capacitor Cst during the immediately preceding data write period (more precisely, a data voltage after threshold compensation), i.e., the data voltage corresponding to the luminance (display luminance) of the organic EL element OLED during the emission period, and the emission line Ej connected to the gate terminal of the p-channel switching transistor T8 has an L-level voltage. Accordingly, while the voltage corresponding to the display luminance is being provided to the gate terminal of the drive transistor T4, the p-channel switching transistor T8 is in ON state. In the case of the pixel circuit 14, the switching transistor T8 is in ON state during the emission period regardless of the value of the display luminance, rather than only while the lower of the data voltages that indicate the maximum and minimum display luminances (in this example, the white display voltage), i.e., the voltage VGL, is being provided to the gate terminal of the drive transistor T4.

In the present embodiment as described above, as in the first embodiment, holes trapped in trap levels within the channel region of the drive transistor T4 by writing the data voltage to the N_G (and the storage capacitor Cst connected thereto) associated with the drive transistor T4 can be discharged through the switching transistor T8 to the initialization line Vini, and therefore it is possible to display an image free of an afterimage during the subsequent frame, as in the first embodiment.

6. Fifth Embodiment (Variant of Second Embodiment)

Described below is a fifth embodiment as another example of the organic EL display device configured as previously described and encompassing the organic EL display devices according to the first through third embodiments, where the n-channel switching transistor T9 is in ON state when the node N_G is being provided with at least the higher of the data voltages that respectively indicate the maximum and minimum display luminances (i.e., the white and black display voltages).

Figure 17:
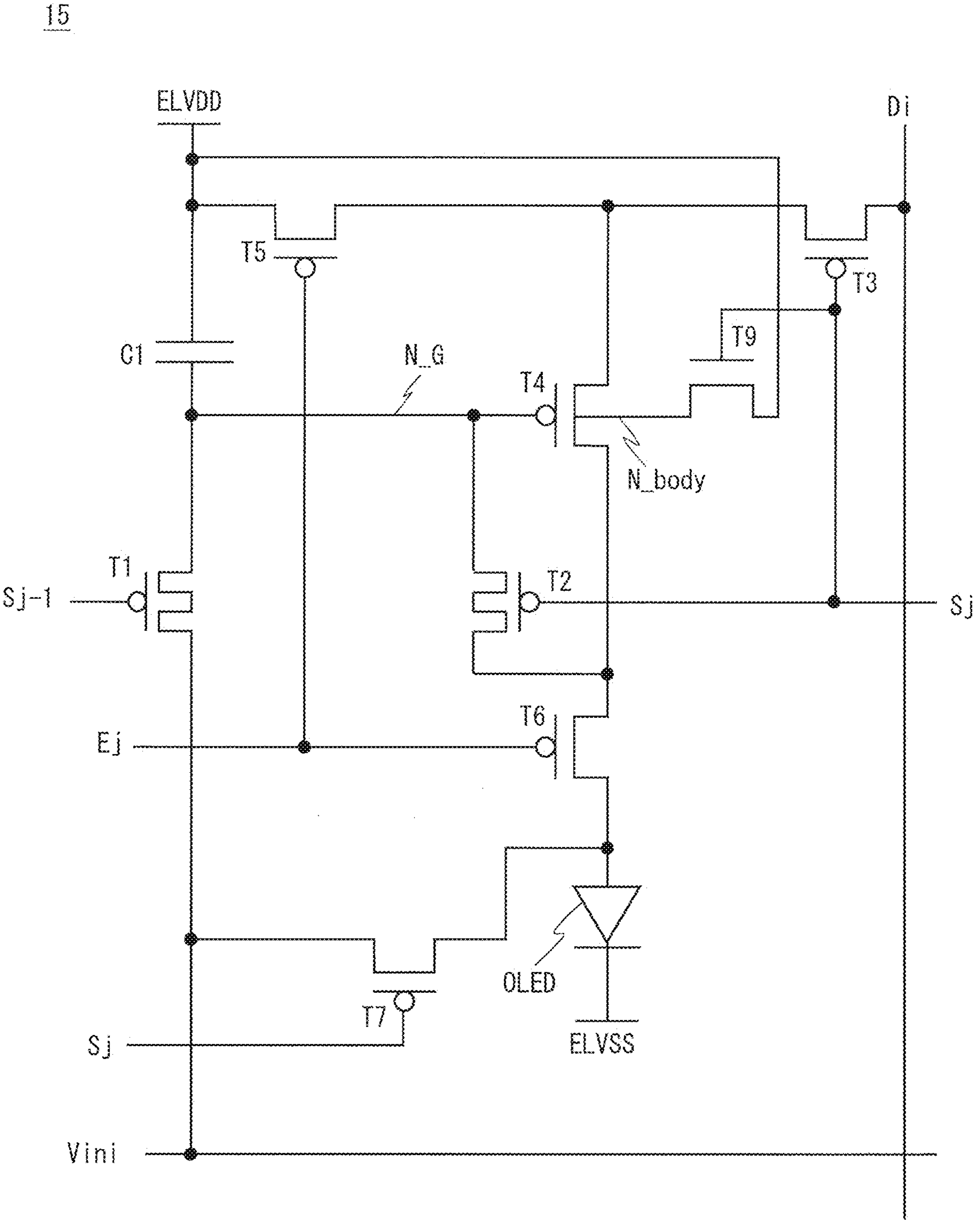
FIG. 17 is a circuit diagram illustrating the configuration of a pixel circuit included in an organic EL display device according to a fifth embodiment.

The present embodiment is a variant of the second embodiment and differs from the second embodiment only in the configuration of the pixel circuit. FIG. 17 is a circuit diagram illustrating the configuration of the pixel circuit 15 in the present embodiment. As shown in FIG. 17, in the pixel circuit 15 in the present embodiment, the n-channel switching transistor T9 is connected at the gate terminal to the corresponding scanning line Sj, and in this regard, the pixel circuit 15 differs from the pixel circuit 12 in the second embodiment (FIG. 10), where the transistor T9 is connected at the gate terminal to the gate terminal of the drive transistor T4 (i.e., the node N_G). Other than the above, the pixel circuit 15 in the present embodiment has the same configuration as that of the pixel circuit 12 in the second embodiment.

In the case of the pixel circuit 15 in the present embodiment as described above, during the emission period, as shown in FIG. 7, the gate terminal of the drive transistor T4 (i.e., the node N_G) is provided with a data voltage written to the storage capacitor Cst during the immediately preceding data write period (more precisely, a data voltage after threshold compensation), i.e., the data voltage corresponding to the luminance (display luminance) of the organic EL element OLED during the emission period, and the scanning line Sj connected to the gate terminal of the n-channel switching transistor T9 has an L-level voltage. Accordingly, while the voltage corresponding to the display luminance is being provided to the gate terminal of the drive transistor T4, the n-channel switching transistor T9 is in ON state. In the case of the pixel circuit 16, the switching transistor T9 is in ON state during the emission period regardless of the value of the display luminance, rather than only while the higher of the data voltages that indicate the maximum and minimum display luminances (in this example, the black display voltage), i.e., the voltage VGH, is being provided to the gate terminal of the drive transistor T4.

Accordingly, in the present embodiment, as in the second embodiment, electrons trapped in trap levels within the channel region of the drive transistor T4 by writing the data voltage to the N_G (and the storage capacitor Cst connected thereto) associated with the drive transistor T4 can be discharged through the switching transistor T9 to the H-level power supply line ELVDD, and therefore it is possible to display an image free of an afterimage during the subsequent frame, as in the second embodiment.

7. Sixth Embodiment (Another Variant of Second Embodiment)

Figure 18:
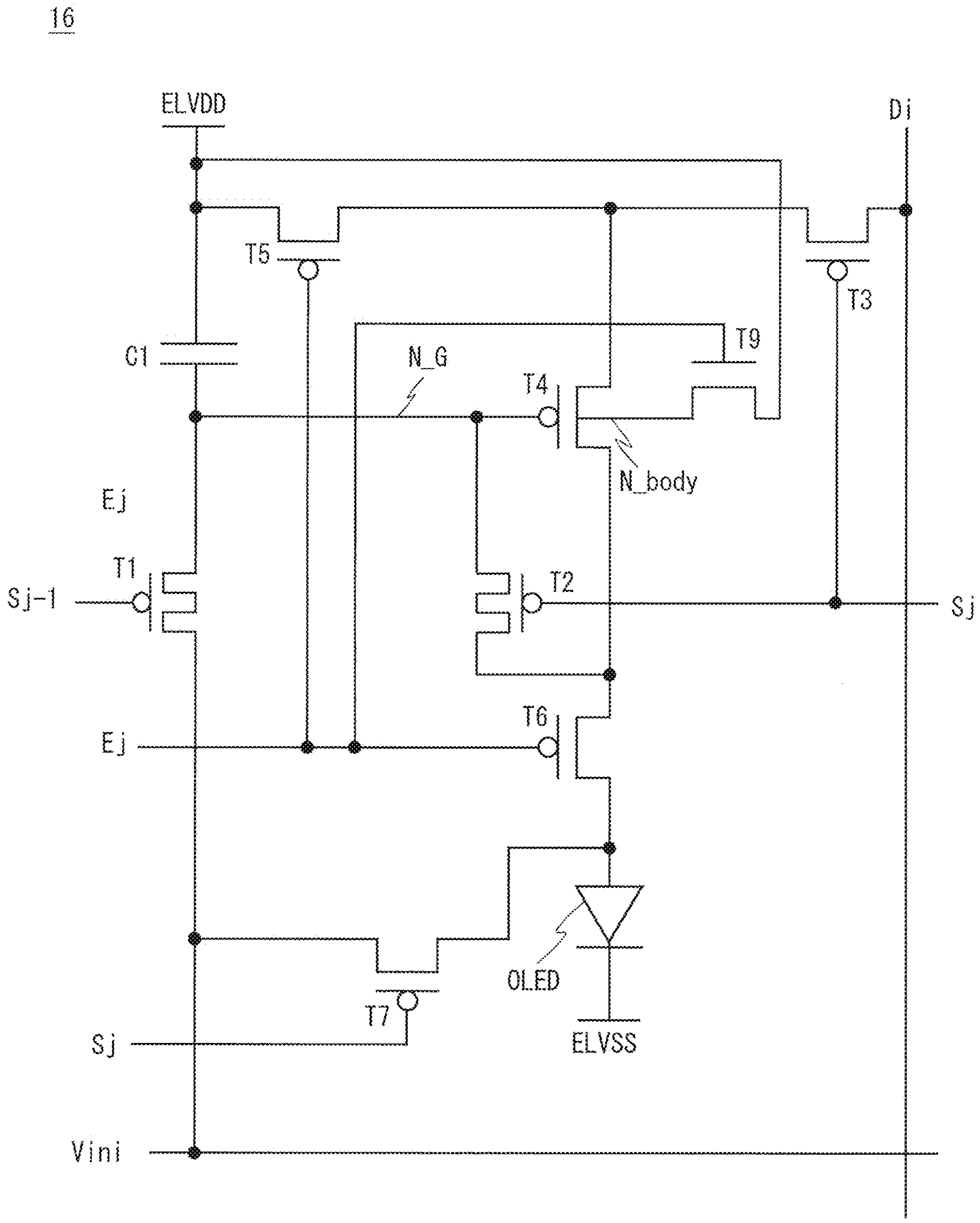
FIG. 18 is a circuit diagram illustrating the configuration of a pixel circuit included in an organic EL display device according to a sixth embodiment.

In a variant of the second embodiment, the gate electrode of the n-channel switching transistor T9 may be connected to the emission line rather than to the protruding portion PR extending from the body portion BY of the node N_G. In this sixth embodiment, an organic EL display device using the thus-configured pixel circuit will be described. FIG. 18 is a circuit diagram illustrating the configuration of the pixel circuit 16 included in the organic EL display device.

In the case of the pixel circuit 16 configured as described above, during the period from time t1 to time t3, as shown in the timing chart of FIG. 6 or 7, the emission line Ej is at H level, keeping the switching transistor T9 on. Accordingly, from time t2 to time t3, electrons trapped in trap levels within the channel region of the drive transistor T4 by writing the data voltage to the N_G associated with the drive transistor T4 can be released through the switching transistor T9 to the H-level power supply line ELVDD, and therefore it is possible to display an image free of an afterimage during the subsequent frame, as in the second embodiment.

8. Seventh Embodiment

In the first through sixth embodiments, the switching transistors T8 and T9 are connected at their respective drain terminals to the L-level initialization line Vini and the H-level power supply line ELVDD, respectively. However, the lines connected to these drain terminals are not limited to the above, and any lines can be connected so long as these lines maintain the H-level and L-level voltages during the emission period or during approximately the same period. Described below is a seventh embodiment as an example of the organic EL display device configured in this manner.

Figure 19:
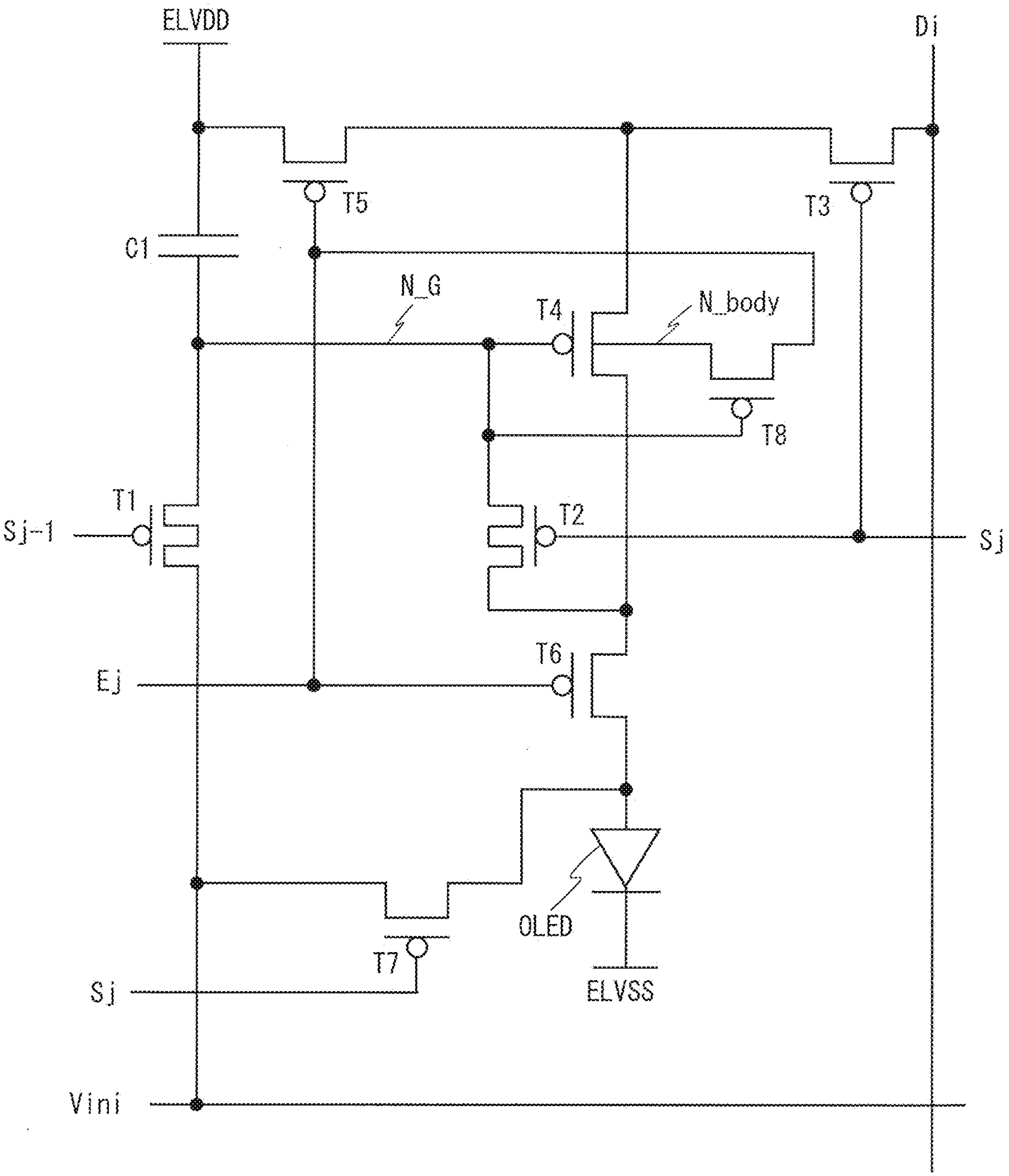
FIG. 19 is a circuit diagram illustrating the configuration of a pixel circuit included in an organic EL display device according to a seventh embodiment.

FIG. 19 is a circuit diagram of the pixel circuit 17 according to the present embodiment. The same timing charts as those shown in FIGS. 6 and 7 and used to describe the first through third embodiments are used for the pixel circuit 17 and therefore will not be elaborated upon. To sufficiently discharge carriers (holes) trapped within the drive transistor T4, it is desirable to connect the drain terminals to their respective lines that function as constant voltage supply lines, as shown in FIG. 19, during the period from time t3 to time t7, which are the start and end times of the emission period, or during approximately the same period. Accordingly, the drain terminal of the p-channel switching transistor T8 is connected to the emission line Ej, which is at L level during the emission period. Thus, the holes trapped within the drive transistor T4 can be discharged through the switching transistor T8 to the emission line Ej.

In this manner, connecting the drain terminal of the p-channel switching transistor T8 to the emission line Ej can also discharge the holes trapped within the drive transistor T4. Thus, the occurrence of an afterimage can be inhibited even when a white display image is followed by a gray display image.

9. Eighth Embodiment

Described next is an eighth embodiment as an exemplary organic EL display device where the drain terminal of the n-channel switching transistor T9 is not connected to the H-level power supply line ELVDD but to another line that maintains the H-level voltage during the emission period or approximately the same period.

Figure 20:
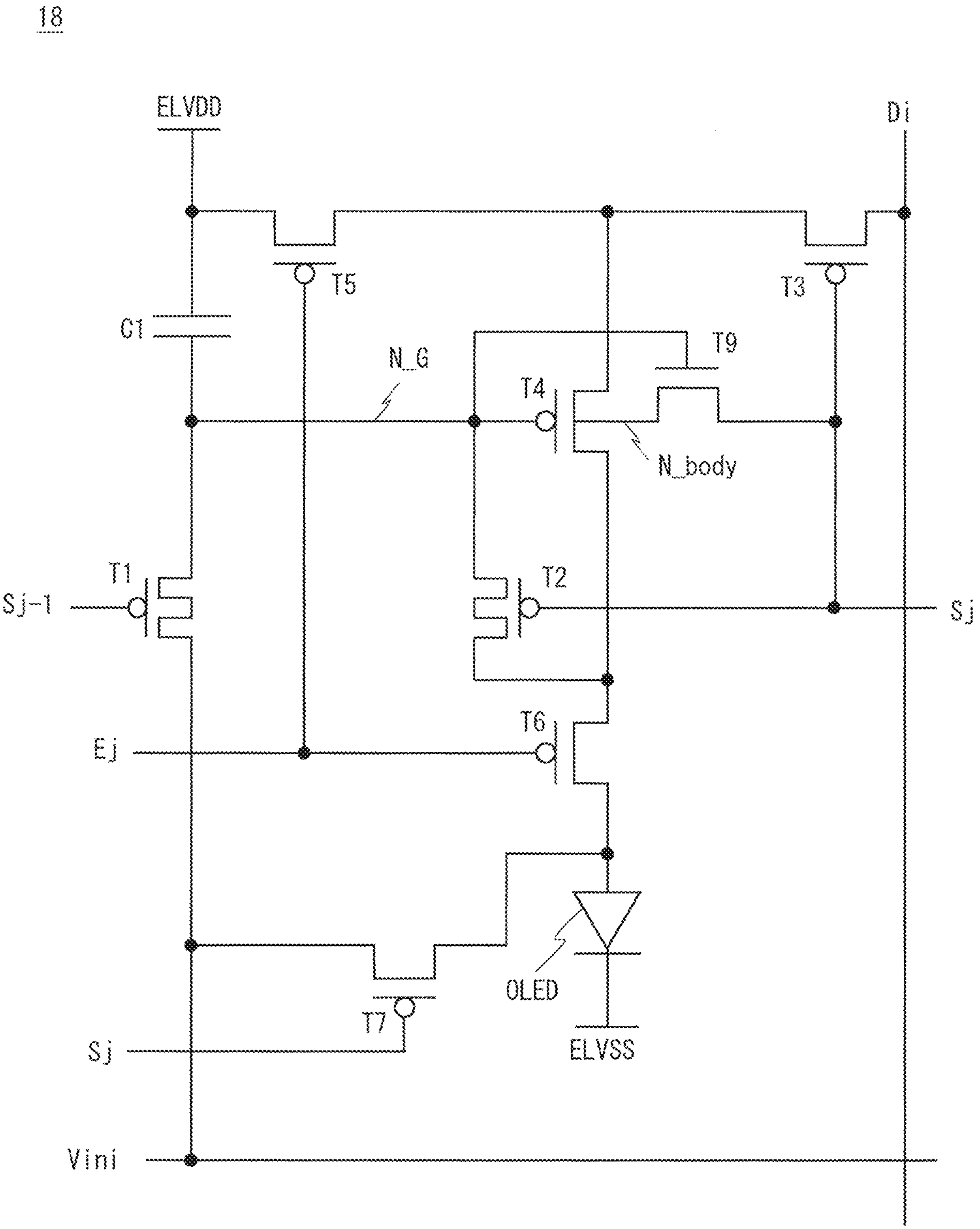
FIG. 20 is a circuit diagram illustrating the configuration of a pixel circuit included in an organic EL display device according to an eighth embodiment.

FIG. 20 is a circuit diagram of the pixel circuit 18 according to the present embodiment. The same timing charts as those shown in FIGS. 6 and 7 and used to describe the first through third embodiments are used for the pixel circuit 18 and therefore will not be elaborated upon. To sufficiently discharge carriers (electrons) trapped within the drive transistor T4, it is desirable to connect the drain terminal of the switching transistor T9 to a line that function as constant voltage supply lines, as shown in FIG. 20, during the period from time t3 to time t7, which are the start and end times of the emission period, or during approximately the same period. Accordingly, the drain terminal of the n-channel switching transistor T9 is connected to the scanning line Sj, which is at H level during the emission period. Thus, the electrons trapped within the drive transistor T4 can be discharged through the switching transistor T9 to the scanning line Sj.

In this manner, connecting the drain terminal of the n-channel switching transistor T9 to the scanning line Sj can also discharge the electrons trapped within the drive transistor T4. Thus, the occurrence of an afterimage can be inhibited even when a black display image is followed by a gray display image.

10. Others

The above embodiments have been described with respect to the cases where the pixel circuit includes the p-channel transistors T1 to T7. However, the pixel circuit may include n-channel transistors. In such a case, as in the embodiments, either the p-channel or n-channel switching transistors, or both, are provided. Thus, when a gray display image is presented during the subsequent frame in an area where a black or white display image is provided during the current frame, the image is displayed with a luminance corresponding to the data voltage, resulting in no perceptible afterimage.

The case where the drive transistor T4 used in the pixel circuit is an n-channel transistor rather than a p-channel transistor will be described in more detail. Effects similar to those achieved by the first embodiment can be achieved by providing the pixel circuit that uses the n-channel drive transistor T4 with, for example, the p-channel switching transistor T8 connected at the source terminal to the channel region of the drive transistor T4, at the drain terminal to a negative voltage supply line, such as the initialization line Vini, and at the gate terminal to the gate terminal of the drive transistor T4, as in the first embodiment (FIG. 3). However, when the drive transistor T4 is of the n-channel type, the L-level data voltage corresponds to the black display voltage (i.e., the data voltage that indicates the minimum display luminance), and the H-level data voltage corresponds to the white display voltage (i.e., the data voltage that indicates the maximum display luminance). Accordingly, with this configuration, when the L-level black display voltage is written to the pixel circuit, holes are trapped in trap levels within the channel region of the drive transistor T4, and the trapped holes are discharged through the switching transistor T8 to the negative voltage supply line during the emission period. Moreover, effects similar to those achieved by the second embodiment can be achieved by providing the pixel circuit that uses the n-channel drive transistor T4 with, for example, the n-channel switching transistor T9 connected at the source terminal to the channel region of the drive transistor T4, at the drain terminal to a positive voltage supply line, such as the H-level power supply line ELVDD, and at the gate terminal to the gate terminal of the drive transistor T4, as in the second embodiment (FIG. 10). With this configuration, when the H-level white display voltage is written to the pixel circuit, electrons are trapped in trap levels within the channel region of the drive transistor T4, and the trapped electrons are discharged through the switching transistor T9 to the positive voltage supply line during the emission period. Further, effects similar to those achieved by the third embodiment can be achieved by providing the pixel circuit that uses the n-channel drive transistor T4 with the p-channel switching transistor T8 and the n-channel switching transistor T9 connected as in the third embodiment.

Furthermore, each of the embodiments uses the pixel circuit of an internal compensation type configured such that the data voltage on the data line Di is written to the node N_G (and the storage capacitor Cst connected thereto) through the drive transistor T4 in diode connection. However, even in the case of pixel circuits of other internal compensation types and pixel circuits that do not perform internal compensation, effects similar to those described above can also be achieved by providing the p-channel switching transistor T8 and/or the n-channel switching transistor T9 connected as in the pixel circuits in the embodiments (see FIGS. 3, 10, 13, 18, and 19).

It should be noted that display devices with features of some of the above embodiments and variants may be configured by arbitrarily combining the features of the display devices described above without contradicting the nature of the features and departing from the spirit of the disclosure.

DESCRIPTION OF THE REFERENCE CHARACTERS

10 display panel
11 to 18 pixel circuit
T1 first initialization transistor
T2 compensation transistor
T3 write transistor
T4 drive transistor
T5 power supply transistor
T6 emission control transistor
T7 second initialization transistor
T8 p-channel switching transistor
T9 n-channel switching transistor
OLED organic EL element (light-emitting display element)
N_G node
N_body body terminal (switching transistor's source region)
ELVDD H-level power supply line (voltage supply line or positive voltage supply line) or H-level voltage
ELVSS L-level power supply line (voltage supply line or negative voltage supply line) or L-level voltage
Vini initialization line (negative voltage supply line)
Sj scanning line (positive voltage supply line)
Ej emission line (negative voltage supply line)

The invention claimed is:

1. A display device comprising:
a plurality of data lines for providing data signals representing an image to be displayed;
a plurality of scanning lines crossing the data lines;
a plurality of pixel circuits arranged corresponding to respective crossing points of the data lines and the scanning lines; and
a constant voltage supply line supplying each pixel circuit with a predetermined voltage, wherein,
each pixel circuit corresponds to one of the data lines and one of the scanning lines,
each pixel circuit includes:
a light-emitting display element configured to emit light with a luminance corresponding to an amount of current supply;
a capacitive element;
a drive transistor connected at a control terminal to a terminal of the capacitive element and configured to regulate the amount of current supply to the light-emitting display element in accordance with a voltage written to the capacitive element; and
a switching transistor connected at a first conductive terminal to a channel region of the drive transistor and at a second conductive terminal to the constant voltage supply line, and
each pixel circuit is configured such that when the corresponding scanning line is active, a voltage on the corresponding data line is provided to the control terminal of the drive transistor and thereby written to the capacitive element, and such that if the control terminal of the drive transistor is being provided with at least a voltage corresponding to a maximum or minimum display luminance, the switching transistor is in ON state.

2. The display device according to claim 1, wherein,
both the drive transistor and the switching transistor are p-channel transistors,
each pixel circuit is configured such that the p-channel switching transistors are in ON state when the voltage being provided to the control terminal of the drive transistor corresponds to the maximum display luminance,
the constant voltage supply line serves as a negative voltage supply line providing a negative voltage, and
the channel region of the drive transistor is connected through the p-channel switching transistors to the negative voltage supply line.

3. The display device according to claim 2, further comprising a positive voltage supply line supplying each pixel circuit with a predetermined positive voltage, wherein,
each pixel circuit further includes an n-channel switching transistor connected at a first conductive terminal to the channel region of the drive transistor and at a second conductive terminal to the positive voltage supply line, and
each pixel circuit is configured such that the n-channel switching transistor is in ON state when the voltage being provided to the control terminal of the drive transistor corresponds to the higher of the voltages that correspond to the maximum and minimum display luminances.

4. The display device according to claim 2, wherein, when there are holes trapped within the channel region of the drive transistor, the holes are discharged to the negative voltage supply line through the p-channel switching transistor connected to the channel region.

5. The display device according to claim 2, wherein the p-channel switching transistor is connected at a control terminal to the control terminal of the drive transistor.

6. The display device according to claim 2, further comprising a plurality of emission lines crossing the data lines, wherein,
each emission line is active while a low-level voltage is being provided and inactive while a high-level voltage is being provided,
each pixel circuit corresponds to one of the emission lines,
each pixel circuit is configured to allow current supply to the light-emitting display element when the corresponding emission line is active and to stop the current supply to the light-emitting display element when the corresponding emission line is inactive, and
the p-channel switching transistor is connected at a control terminal to the corresponding emission line.

7. The display device according to claim 2, wherein the negative voltage supply line is an initialization line for initializing the voltage at the control terminal of the drive transistor.

8. The display device according to claim 2, further comprising a plurality of emission lines crossing the data lines, wherein, each emission line is active while a low-level voltage is being provided and inactive while a high-level voltage is being provided, each pixel circuit corresponds to one of the emission lines, each pixel circuit is configured to allow current supply to the light-emitting display element when the corresponding emission line is active and to stop the current supply to the light-emitting display element when the corresponding emission line is inactive, and for each pixel circuit, the corresponding emission line serves as the negative voltage supply line.

9. The display device according to claim 1, wherein, the drive transistor is a p-channel transistor, and the switching transistor is an n-channel transistor, each pixel circuit is configured such that the n-channel switching transistor is in ON state when the voltage being provided to the control terminal of the drive transistor corresponds to the minimum display luminance, the constant voltage supply line serves as a positive voltage supply line providing a positive voltage, and the channel region of the drive transistor is connected through the n-channel switching transistor to the positive voltage supply line.

10. The display device according to claim 9, wherein, when there are electrons trapped within the channel region of the drive transistor, the electrons are discharged to the positive voltage supply line through the n-channel switching transistor connected to the channel region.

11. The display device according to claim 9, wherein the n-channel switching transistor is connected at a control terminal to the control terminal of the drive transistor.

12. The display device according to claim 9, wherein, each scanning line is active while a low-level voltage is being provided and inactive while a high-level voltage is being provided, and the n-channel switching transistor is connected at a control terminal to the corresponding scanning line.

13. The display device according to claim 9, further comprising a plurality of emission lines crossing the data lines, wherein, each emission line is active while a low-level voltage is being provided and inactive while a high-level voltage is being provided, each pixel circuit corresponds to one of the emission lines, each pixel circuit is configured to allow current supply to the light-emitting display element when the corresponding emission line is active and to stop the current supply to the light-emitting display element when the corresponding emission line is inactive, and the n-channel switching transistor is connected at a control terminal to the corresponding emission line.

14. The display device according to claim 9, wherein the positive voltage supply line is a power supply line for supplying the light-emitting display element with a drive current.

15. The display device according to claim 9, wherein, each scanning line is active while a low-level voltage is being provided and inactive while a high-level voltage is being provided, and for each pixel circuit, the corresponding scanning line serves as the positive voltage supply line.

16. The display device according to claim 1, wherein, both the drive transistor and the switching transistor are n-channel transistors, each pixel circuit is configured such that the n-channel switching transistors are in ON state when the voltage being provided to the control terminal of the drive transistor corresponds to the maximum display luminance, the constant voltage supply line serves as a positive voltage supply line providing a positive voltage, and the channel region of the drive transistor is connected through the n-channel switching transistors to the positive voltage supply line.

17. The display device according to claim 1, wherein, the drive transistor is an n-channel transistor, and the switching transistor is a p-channel transistor, each pixel circuit is configured such that the p-channel switching transistor is in ON state when the voltage being provided to the control terminal of the drive transistor corresponds to the minimum display luminance, the constant voltage supply line serves as a negative voltage supply line providing a negative voltage, and the channel region of the drive transistor is connected through the p-channel switching transistor to the negative voltage supply line.

18. The display device according to claim 1, wherein each pixel circuit is configured such that when the corresponding scanning line is active, the drive transistor is in diode connection, and the voltage on the corresponding data line is provided through the drive transistor to the control terminal of the drive transistor and thereby written to the capacitive element.

19. The display device according to claim 1, further comprising a plurality of emission lines crossing the data lines, wherein, each emission line is active while a low-level voltage is being provided and inactive when a high-level voltage is being provided, each pixel circuit corresponds to one of the emission lines, and each pixel circuit further includes:

a first initialization transistor connected at a control terminal to the corresponding scanning line, at a first conductive terminal to a node where the control terminal of the drive transistor and the terminal of the capacitive element are connected, and at a second conductive terminal to an initialization line providing an initialization potential for initializing the node, the first initialization transistor being turned on to initialize a potential at the node during an initialization period preceding a data write period for writing the voltage on the corresponding data line to the capacitive element;

a write transistor connected at a control terminal to the corresponding scanning line, at a first conductive terminal to the corresponding data line, and at a second conductive terminal to a first conductive terminal of the drive transistor, the write transistor being turned on when the corresponding scanning line becomes active during the data write period, thereby supplying the drive transistor with the voltage on the corresponding data line;

a compensation transistor connected at a control terminal to the corresponding scanning line, at a first conductive terminal to a second conductive terminal of the drive transistor, and at a second conductive terminal to the control terminal of the drive transistor, the compensation transistor being turned on when the corresponding scanning line becomes active during the data write period, thereby diode-connecting the drive transistor;

a power supply transistor connected at a control terminal to the corresponding emission line, at a first conductive terminal to a power supply line for supplying the light-emitting display element with a drive current, and at a second conductive terminal to the first conductive terminal of the drive transistor, the power supply transistor being turned off when the corresponding emission line becomes inactive during a non-emission period being set to include the initialization period and the data write period and being turned on when the corresponding emission line becomes active during an emission period subsequent to the data write period; and an emission control transistor connected at a control terminal to the corresponding emission line, at a first conductive terminal to the second conductive terminal of the drive transistor, and at a second conductive terminal to an anode of the light-emitting display element, the emission control transistor being turned off when the corresponding emission line becomes inactive during the non-emission period and being turned on when the corresponding emission line becomes active during the emission period.

* * * * *